(12) United States Patent
Kong et al.

(10) Patent No.: US 11,924,342 B2
(45) Date of Patent: Mar. 5, 2024

(54) COMPUTER-IMPLEMENTED METHODS FOR EVIDENCING THE EXISTENCE OF A DIGITAL DOCUMENT, ANONYMOUSLY EVIDENCING THE EXISTENCE OF A DIGITAL DOCUMENT, AND VERIFYING THE DATA INTEGRITY OF A DIGITAL DOCUMENT

(71) Applicant: 707 Limited, Central (HK)

(72) Inventors: Johnson Zone An Kong, Tai Po (HK); Michael Ming-Jae Lin, Pok Fu Lam (HK); Wei Hsiung Nicolas Yang, Hong Kong (HK)

(73) Assignee: 707 Limited, Central District (HK)

( * ) Notice: Subject to any disclaimer, the term of this patent is extended or adjusted under 35 U.S.C. 154(b) by 181 days.

(21) Appl. No.: 17/526,161

(22) Filed: Nov. 15, 2021

(65) Prior Publication Data

US 2022/0078008 A1    Mar. 10, 2022

Related U.S. Application Data

(63) Continuation-in-part of application No. 16/622,824, filed as application No. PCT/CN2018/091833 on Jun. 19, 2018, now Pat. No. 11,177,940.

(30) Foreign Application Priority Data

Jun. 20, 2017   (HK) .................................. 17106138.1

(51) Int. Cl.
*H04L 9/08*    (2006.01)
*G06F 21/64*   (2013.01)
*H04L 9/32*    (2006.01)

(52) U.S. Cl.
CPC .......... *H04L 9/0872* (2013.01); *G06F 21/645* (2013.01); *H04L 9/0894* (2013.01);
(Continued)

(58) Field of Classification Search
CPC ... H04L 9/0637; H04L 9/0643; H04L 9/0894; H04L 9/3297; H04L 2209/38; G06F 21/602; G06F 21/64
See application file for complete search history.

(56) References Cited

U.S. PATENT DOCUMENTS 8,892,532 B2 * 11/2014 Sogtrop .................. G06F 16/93
                                                              707/661
9,443,108 B1 *  9/2016 Roth ....................... G06F 21/70
(Continued)

FOREIGN PATENT DOCUMENTS

| CN | 106503992 A | 3/2017 |
|----|-------------|--------|
| JP | 2010081372 A | 4/2010 |
| WO | 2023086444 A2 | 5/2023 |

OTHER PUBLICATIONS

First Office Action dated Jan. 5, 2023, in Japanese patent application No. 2022-011521, 4 pages.
(Continued)

*Primary Examiner* — Michael R Vaughan
(74) *Attorney, Agent, or Firm* — Blueshift IP LLC; Robert Plotkin

(57) ABSTRACT

Improved computer-implemented methods for evidencing the existence of a digital document, anonymously evidencing the existence of a digital document, database management for systems for evidencing the existence of a digital document, and verifying the data integrity of a digital document provide increased reliability, security and enhance trust from users and third parties.

21 Claims, 15 Drawing Sheets

(52) U.S. Cl.
CPC ............ *H04L 9/321* (2013.01); *H04L 9/3236* (2013.01); *H04L 9/3297* (2013.01)

(56) References Cited

U.S. PATENT DOCUMENTS

| | | | |
|---|---|---|---|
| 9,679,276 B1* | 6/2017 | Cuende | G06Q 20/3827 |
| 11,177,940 B2 | 11/2021 | Kong et al. | |
| 2007/0226507 A1 | 9/2007 | Schilling | |
| 2014/0136838 A1* | 5/2014 | Mossbarger | H04L 63/0823 |
| | | | 713/156 |
| 2016/0212146 A1* | 7/2016 | Wilson | H04L 9/3226 |
| 2018/0181909 A1* | 6/2018 | Wilkinson | G06F 16/7867 |
| 2018/0285996 A1* | 10/2018 | Ma | H04L 9/3297 |
| 2018/0341701 A1* | 11/2018 | Verma | G06F 7/026 |
| 2020/0244470 A1* | 7/2020 | Ruckriemen | H04L 9/3236 |
| 2020/0267163 A1* | 8/2020 | Wilson | G06F 16/907 |

OTHER PUBLICATIONS

Anonymous, "Proof of Existence—Wikipedia," Nov. 7, 2018, 4 pages. XP055659395 Retrieved from the Internet on Jan. 20, 2020: URL:https://en.wikipedia.org/w/index.php?title=Proof_of_Existence&oldid=867746283.

Communication Relating to the Results of the Partial International Search dated Apr. 5, 2023, in international patent application No. PCT/US2022/049498, 13 pages.

Blk.dat "How do they work?" Online, 7 pages, published about Jan. 9, 2017 [unverified]. Retrieved and provided by the European Patent Office on Jan. 10, 2022, at: https://learnmeabitcoin.com/technical/blkdat.

* cited by examiner

COMPUTER-IMPLEMENTED METHODS FOR EVIDENCING THE EXISTENCE OF A DIGITAL DOCUMENT, ANONYMOUSLY EVIDENCING THE EXISTENCE OF A DIGITAL DOCUMENT, AND VERIFYING THE DATA INTEGRITY OF A DIGITAL DOCUMENT

FIELD OF THE INVENTION

The present invention relates to methods of evidencing the existence of a digital document. Specifically, the present invention relates to methods of evidencing the existence and data integrity of a digital document.

BACKGROUND OF THE INVENTION

In the digital knowledge economy, Intellectual Property (IP) is often a person's or company's most valuable asset. IP laws were designed to benefit society by encouraging the creation of new, valuable IP by recognizing creators, owners and/or inventors and by offering them legal and economic benefits. One of the critical prerequisites to all IP rights (IPRs) is originality. Having said that, it is often important to know when IP was created and/or first used; and who is the creator, owner or inventor as this often determines the ownership of the related IPRs.

One method to prove originality and/or creation is by a digital "birth certificate." As soon as the creator, owner or inventor creates a new digital work (whether as an image, video, document, song, etc.), a new trade secret, a new copyrightable work, a new design for a new trademark logo, and/or the genesis of a new invention and saves it digitally, a digital birth certificate consisting of and/or associated with a time stamp may be provided. However, relying simply upon the time stamp of the computer upon which the digital document was created is often insufficient as such time/date stamps may be changed forged, or simply incorrect if they rely upon the computer's time alone.

Increased incidences of hacking such as the Solar Winds incident exposed in 2021 further show the existing and increasing need to verify that data, software, and specifically software installation packages, remain pristine and untampered with before they are transferred into a user's system, or installed therein.

Blockchain systems are known which employ cryptographic hashes to record and create links, such as transactions and/or other data, which is then stored on a ledger, typically either an open ledger or a closed ledger, although semi-open ledgers are also possible. However, a common problem with block chain systems is that as their chains become longer and longer, then their systems require more and more time, computing power, and energy to generate the next virtual link in the chain. At a certain point, the law of diminishing returns indicates that the generation of the next link in the chain will become either too slow, energy intensive, and/or otherwise unsustainable. Accordingly, there is a need to improve the current block chain system architecture and reduce the incidence of hacking.

Therefore, it is desirable to be able to provide a method that can quickly and easily provide an irrefutable time and date stamp and digital certificate, such as a digital fingerprint, to evidence the new creation, possession and/or the genesis of a digital document. Preferably, such a method provides a temporal record uniquely identifying the digital file without exposing the actual digital content in any way. It is also desirable that such a record be securely stored, preferably with a trusted organization, and/or have a standardized time stamp. It is also desirable to provide a unique digital fingerprint for each digital document. It is also desirable to be able to detect whether the digital document has been altered or changed from the digital document which is indicated by the digital fingerprint. The need also exists for an easier and more efficient method for authenticating a digital document, especially in court or other tribunal, for cases of trade secret theft, prior use defenses, copyright actions, and the like. Thus, there exists the need for additional methods for evidencing the existence of a digital document and understanding the metadata associated with the digital document. There also exists a need for an improved method for anonymously evidencing the existence of a digital document without sacrificing privacy or revealing too much personal information. There also exists the need for improved database management for systems for evidencing the existence of a digital document. There also exists a need for verifying the integrity of a digital document in a user's system by the user and/or a third party. The need also exists for an improved blockchain system.

SUMMARY OF THE INVENTION

The present invention relates to a computer-implemented method for evidencing the existence of a digital document having the steps of obtaining metadata of a digital document in a user's system, obtaining a cryptographic hash of the digital document via the user's system, sending the metadata and the cryptographic hash from the user's system to a remote device, receiving the metadata and the cryptographic hash at the remote device, requesting a time stamp from a time source, receiving the time stamp at the remote device from the time source, combining the metadata, the cryptographic hash, and the time stamp in an evidence key generator to generate an evidence key, storing the evidence key to provide a stored evidence key, generating a further cryptographic hash of the evidence key in a further evidence key generator to form a further evidence key, and storing the further evidence key to form a stored further evidence key. The remote device does not include the time source and the time stamp is based on the time that the remote device receives the metadata and the cryptographic hash. During the method for evidencing the existence of the digital document, the digital document remains within the user's system.

An embodiment of the present invention relates to a computer-implemented method for anonymously evidencing the existence of a digital document including the steps of obtaining metadata of a digital document in a user's system, obtaining a cryptographic hash of the digital document, sending the metadata and the cryptographic hash to a remote device, receiving the metadata and the cryptographic hash at the remoted device, requesting the user's identity data from an identity source, obtaining a cryptographic hash of the user's identity data to form an identity hash, receiving the identity hash at the remote device, combining the metadata, the cryptographic hash, and the identity hash at the remote device in an evidence key generator to generate an evidence key, storing the evidence key to provide a stored evidence key, generating a reference code for the stored evidence key, and sending the reference code to the user. In this method, the digital document never leaves the user's system, the identity data never leaves the identity source, and the reference code allows a third party to access the evidence key; or allows a third party limited access to the evidence key.

In an embodiment herein, the invention includes a computer-implemented method for evidencing the existence of a digital document including the steps of obtaining a log of previous cryptographic hashes from a user's system, obtaining a cryptographic hash of the digital document, checking the log to see if the cryptographic hash matches any of the previous cryptographic hashes, and if the cryptographic hash does not match any of the previous cryptographic hashes, then sending the cryptographic hash to a remote device.

In an embodiment of the method herein, a computer-implemented method for evidencing the existence of a digital document includes the steps of obtaining metadata of a digital document on a user's system, obtaining a cryptographic hash of the digital document, sending the metadata and the cryptographic hash from the user's system to a remote device, receiving the metadata and the cryptographic hash at the remote device, requesting a time stamp from a time source, receiving the time stamp at the remote device from the time source, combining the metadata, the cryptographic hash, and the time stamp to at the remote device in an evidence key generator to generate an evidence key, combining a plurality of evidence keys to form a compound evidence key, storing the compound evidence key to provide a stored compound evidence key, generating a further cryptographic hash of the compound evidence key to form a further evidence key, and storing the further evidence key to form a stored further evidence key. The remote device does not include the time source and the time stamp is based upon the time that the remote device receives the metadata and the cryptographic hash.

An embodiment of the present invention relates to a method for verifying the data integrity of a digital document including the steps of storing a digital document on a user's system, obtaining metadata of the digital document, typically from the user's system, obtaining a cryptographic hash of the digital document, sending the metadata and the cryptographic hash to a remote device, receiving the metadata and the cryptographic hash at the remote device, requesting a time stamp from a time source, receiving the time stamp at the remote device from the time source, combining the metadata, the cryptographic hash, and the time stamp at the remote device in an evidence key generator to generate an evidence key, and storing the evidence key to provide a stored evidence key. Typically, the remote device does not include the time source. In the method herein, a third party user obtains a second cryptographic hash of the digital document, compares the second cryptographic hash with the cryptographic hash in the stored evidence key to generate a comparison result, and the third party user is notified of the comparison result. During the method the digital document remains within the user's system, the third party user's system, or both.

Without intending to be limited by theory, it is believed that the methods and systems embodied by the present invention provide improved methods for evidencing the existence of a digital document, for verifying the data integrity of a digital document, and/or managing a digital database for achieving these goals. It is believed that the methods and systems herein are minimally-energy-intensive, may be operable on virtually any computing device, and user-friendly. It is further believed that the methods and systems herein may enhance trust between users and third parties in their digital documents, and the management thereof.

BRIEF DESCRIPTION OF THE DRAWINGS

For a more complete understanding of the present invention, reference is made to the following detailed description and accompanying drawings, in which.

Figure 1:
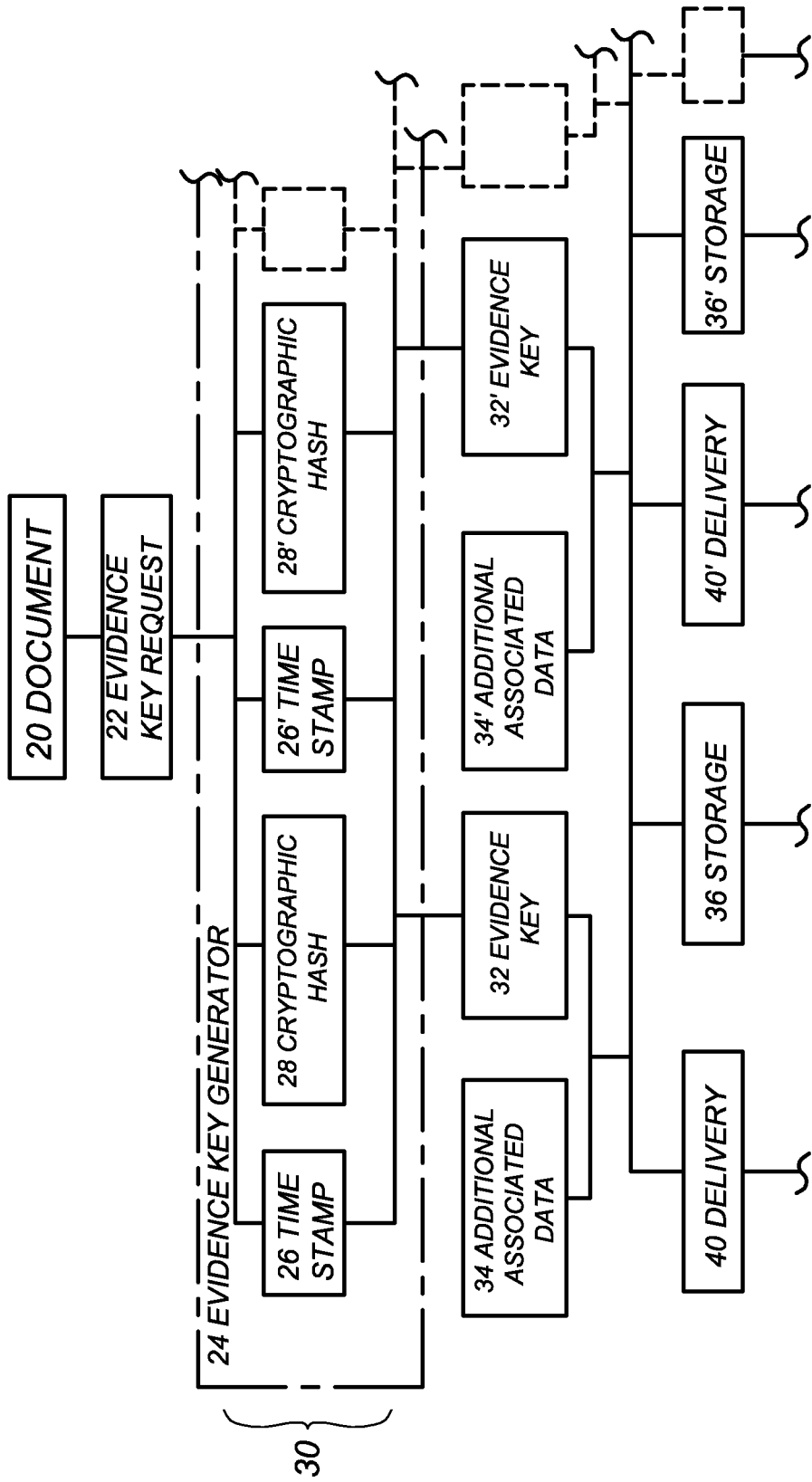
FIG. 1 shows a diagram of embodiment of the present invention.

The figures herein are for illustrative purposes only and do not necessarily show all necessary or optional steps, components, and/or other details.

DETAILED DESCRIPTION OF THE INVENTION

As used herein, the term "comprising" means including the following elements but not excluding others.

As used herein, the terms "couple" or "connect" refers to electrically-coupling or connecting either directly or indirectly via one or more electrical or wireless methods, unless otherwise stated.

As used herein, the phrase "document" when used alone indicates a digital document and indicates any document that is stored digitally, rather than in a physical (e.g. printed or written) form, including but not limited to, a letter, a presentation, a CAD file, a sound, a video, a picture, an image, a spreadsheet, software, an algorithm, a program, a digitized scent, a digitized feel/tactile, a digitized taste profile, a digitized visual element, a blockchain, a cryptocurrency, a smart contract, a ledger, a distributed ledger, a non-fungible token, a virtual reality element, a wireframe, an augmented reality element, a digital avatar, etc. and a combination thereof. It is recognized that the digital document herein may be a partial or total digital representation of a physical document, and may include additional elements not present in the physical document. Furthermore, it is recognized that the digital document itself may actually contain one or more digital files; for example, the digital document herein may be a database with multiple digital files therein, a folder with multiple digital files therein, an entire hard drive with multiple digital files herein, a server with multiple databases therein, etc. One skilled in the art further understands that the digital document herein may be in any format such as, but not limited to .pdf, .doc, .docx, .xls, .xlsx, .ppt, .pptx, .msg, .xlsm, .jpg, .png, .bmp, .mp3, gif, easm, .st p, .pst, zip, .dat, .txt, .mov, midi, .rtf, log, .csv, .exe, .dmg, advanced formats thereof, etc.

As used herein, "location" indicates a physical position indicated by, for example, a geographic location, such as a set of map coordinates, a set of GPS coordinates, a street address, and/or other recognized physical location indicators, a digital/virtual position, such as, for example, an internet protocol address, a MAC address, an system or network identifier, etc., an indicator which corresponds to a combination of a specific physical position and a digital/virtual position, or a combination thereof.

As used herein, "time" indicates the time as well as the date or an associated value which corresponds to a specific time and date.

As used herein "user" indicates someone who is using the methods herein, and may be an individual, an institution, a government, a legal entity, a non-legal entity, a computer, a computer system, etc. As used herein, the term "user" includes the user's system, which may include a computerized device, a computer server, a computer network, an entire computer system, etc.

The "user's system" herein is non-specific and generally indicates that the user controls the system and/or possesses influence, ownership and/or otherwise controls who and what (e.g., other systems) can access the system ("access control") and the data and information flowing out of the system. The term includes physical control (e.g., possession of physical computer assets) as well as related "cloud-computing" accounts, etc. to which the user exerts some level of access control.

The phrase "in the user's system" as used herein indicates that the digital document is located, either permanently or transiently within the user's system.

The present invention relates to a computer-implemented method for evidencing the existence of a digital document having the steps of obtaining a time stamp of the digital document, obtaining a plurality of cryptographic hashes of the digital document, generating an evidence key based on the time stamp and the plurality of cryptographic hashes, and storing the evidence key to provide a stored evidence key.

The present invention also relates to a computer-implemented method for evidencing the existence of a digital document having the steps of obtaining a plurality of time stamps of the digital document, obtaining a cryptographic hash of the digital document, generating an evidence key based on the plurality of time stamps and the cryptographic hash, and storing the evidence key to provide a stored evidence key.

The present invention also relates to a computer-implemented method for evidencing the existence of a digital document having the steps of obtaining a time stamp, optionally with permission-based and/or non-permission-based metadata, of the digital document, obtaining a cryptographic hash of the digital document, generating an evidence key based on the time stamp and the cryptographic hash, and storing the evidence key to provide a stored evidence key. The storing of the evidence key is stored on a plurality of storage media.

The present invention relates to a computer-implemented method for evidencing the existence of a digital document having the steps of obtaining metadata of a digital document in a user's system, obtaining a cryptographic hash of the digital document via the user's system, sending the metadata and the cryptographic hash from the user's system to a remote device, receiving the metadata and the cryptographic hash at the remote device, requesting a time stamp from a time source, receiving the time stamp at the remote device from the time source, combining the metadata, the cryptographic hash, and the time stamp in an evidence key generator to generate an evidence key, storing the evidence key to provide a stored evidence key, generating a further cryptographic hash of the evidence key in a further evidence key generator to form a further evidence key, and storing the further evidence key to form a stored further evidence key. The remote device does not include the time source; i.e., the time source is separate from the remote device, and typically the time source is also separate from the evidence key generator. The time stamp is based upon the time that the remote device receives the metadata and the cryptographic hash. During the method herein for evidencing the existence of the digital document, the digital document remains within the user's system. It is recognized that the evidence key generator and the further evidence key generator may be the same, or different.

In the method herein, the digital document starts off in; or within, the user's system, and remains within the user's system at all times; i.e., it is not sent to the remote device during this method. It is believed that separating the time source from the remote device (and the evidence key generator), increases trust in the system by increasing security and reliability, and reducing the chance that an erroneous time stamp is associated with the metadata, the cryptographic hash, the evidence key, etc. The time stamp is based upon the time that the remote device receives the metadata and the cryptographic hash. For example, upon receipt of the metadata and the cryptographic hash, the remote device may execute an instruction to retrieve the current time from a time source which becomes a time stamp. In another embodiment herein, the time stamp is obtained from a time source such as a time server, an international clock, network protocol time, an independent clock, an atomic clock, and a combination thereof, or a time server, an atomic clock, an independent clock, a dedicated time server, and a combination thereof. In an embodiment herein the independent clock is a Global Positioning System (GPS) clock, a GPS master clock, internet server time, data value time, UTC time and a combination thereof. It is recognized that the systems and methods herein are highly-dependent upon receiving an accurate time stamp and therefore in an embodiment herein, the time source has a stratum of from about 1 to about 8; or from about 1 to about 5; or from about 1 to about 3; or from about 1 to about 2; or about 1. In an embodiment herein the remote device, the evidence key generator, and/or the storage server receives a time stamp from a plurality of time sources.

In an embodiment herein, the time stamp may be associated with time source metadata (see FIG. 1 at 209), such as, for example, metadata about the time source, metadata about the remote device, or other metadata related to the time stamp, the time source, and/or the instructions to request/receive the time stamp such as a machine ID, a MAC ID, etc.

The metadata herein is data, typically structured data, which relates to or describes other data, in this case the digital document, the user's system, etc. The metadata may be selected from the group of digital document metadata, user metadata, system metadata, miscellaneous metadata, and a combination thereof. In an embodiment herein, the metadata relates to, or includes, metadata about the digital document, the cryptographic hash, the evidence key generator, the evidence key, the time stamp, etc., and/or how the digital document, the cryptographic hash, the evidence key generator, the evidence key, the time stamp, etc. has been processed, transformed, configured, modified, combined, amended, etc.

In an embodiment herein, the metadata relates to the location and/or presence of the digital document's position on or in a blockchain or other distributed ledger system. In an embodiment herein, the metadata relates to a smart contract, a term of a smart contract, a transaction, etc. In an embodiment herein, the metadata relates to partial or complete ownership interest of the digital document, a lien on the digital document, etc. In an embodiment herein the metadata includes a combination of metadata and even the same metadata.

Furthermore, the metadata herein may be automatically collected by the user or another's system, or may be specifically input by the user and/or the user's system, or both, as desired. The digital document metadata may include, for example, an author(s), a version number or identifier, a file name, a file property, an abstract, a summary, a keyword, a digital document's location in the user's system (e.g., the folder location), a digital document file history, and a combination thereof. The file property may include metadata selected from the group of a file size, a date of creation, a revision number, a modification date or the date of last modification, a geotag, an author/creator's name or reference, a project name, the hardware and/or software used to create the digital document, the hardware and/or software used to modify the digital document, a file format identifier, a structural identifier, a relationship to another digital document, and a combination thereof. The user metadata may include metadata selected from the group of a user's name, a user's location, a user's position, a user's project, a user's computer/system details (e.g., the make and model of the user's computer, the operating system, etc.), a user's management structure, a user's group, a user's division, a user's company, a user's account information, a user's device's IP address, a user's device's MAC address, a user's password, a user's encryption key (e.g., a public/private key), a user's contact information, and a combination thereof. The system metadata is metadata related to the user's computer system and may include metadata selected from the group of a system's IP address, a system's MAC address, a system's owner, a system's location, a system statistic, a system account information, a system structure, a system resource, a system, an operating system version, and a combination thereof. Miscellaneous metadata is metadata relating to other types of data and may include metadata selected from the group of legal metadata, statistical metadata, resource metadata, permission metadata, transaction metadata, smart contract metadata, and a combination thereof.

The sending of the metadata and the cryptographic hash from the user's system to a remote device may occur via any method or system as desired, and may be, for example, a transmission; or a wired transmission, a wireless transmission, a direct transmission, an indirect transmission, etc. as desired. In an embodiment herein, the sending of the metadata and the cryptographic hash from the user's system to the remote device is conducted over the internet.

In an embodiment herein, the method includes the step of obtaining further metadata; or further metadata of the digital document, from a source selected from the group of the user, the user's system, and a combination thereof. Further metadata may be metadata relating to a change in the (original) digital document, the metadata, the cryptographic hash, the time stamp, the evidence key, the evidence key generator, the remote device, etc. linking the (original) digital document, the metadata, the cryptographic hash, the time stamp, the evidence key, etc. to subsequent revisions and/or versions thereof. In an embodiment the further metadata relates to a transformation, a transaction, ownership, a lien, an obligation, etc. In an embodiment herein, the further metadata is manually-entered by the user. In an embodiment herein the further metadata is collected by and/or obtained from the user or a third party user. In an embodiment herein, the further metadata includes a combination of further metadata, the same further metadata, and/or metadata.

In an embodiment herein, the method includes the step of providing the further metadata to a third party; or providing the further metadata to the third party where the further metadata is not provided to the remote device. The further metadata could be, for example, provided to a third party directly by the user, the user's system, and a combination thereof. In such a case, the user will typically give their consent to providing the further metadata; thus in an embodiment herein, the method includes the step of obtaining the user's consent to send the further metadata to a third party, where the obtaining of the user's consent occurs prior to the sending of the further metadata to the third party.

In an embodiment herein, and to enhance the security of the system by preventing the dissemination of the digital document, the user's system does not send the digital document; or only sends the metadata, the cryptographic hash, the further metadata, the further cryptographic hash and a combination thereof, or the metadata, the cryptographic hash and a combination thereof, to the remote device. It is believed that in such a case the digital document is better protected because it never leaves the user's system and they maintain possession and control; therefore even if the remote device is hacked or otherwise compromised, the attackers still do not gain access to the original digital document—only potentially the metadata and the cryptographic hash. In an embodiment any data sent to or from the user's system to or from the remote device is encrypted, for example, encrypted with private key/public key encryption.

In an embodiment herein, a further cryptographic hash is generated in the further evidence key generator from the evidence key and the metadata; or from the evidence key and the further metadata; or from the evidence key, the metadata, and the further metadata. In an embodiment herein, the further evidence key is generated in the further evidence key generator from the evidence key, the time stamp, and the metadata; or from the evidence key, the time stamp, and the further metadata; or from the evidence key, the time stamp, the metadata, and the further metadata.

Without intending to be limited by theory, it is believed that such a method allows, for example, a third party, to receive, manipulate, and/or analyze the further evidence key while still providing security; or an additional level of security, for the digital document. Thus in an embodiment herein, the method further includes the step of providing; or sending, the further cryptographic hash to a third party. As obtaining the user's consent is again very important and may be required, the method herein may further include the step of obtaining the user's consent to send the further cryptographic hash to a third party, where the obtaining of the user's consent occurs prior to the sending of the further cryptographic hash to the third party. An embodiment of the present invention relates to a computer-implemented method for anonymously evidencing the existence of a digital document including the steps of obtaining metadata of a digital document in a user's system, obtaining a cryptographic hash of the digital document, sending the metadata and the cryptographic hash to a remote device, receiving the metadata and the cryptographic hash at the remote device, requesting the user's identity data from an identity source, obtaining a cryptographic hash of the user's identity data to form an identity hash, combining the metadata, the cryptographic hash, and the identity hash at the remote device in an evidence key generator to generate an evidence key, storing the evidence key to provide a stored evidence key, generating a reference code for the stored evidence key, and sending the reference code to the user. The digital document never leaves the user's system, the identity document never leaves the user's system, and the reference code, such as, for example, a web link, a bar code, a QR code, etc., allows a third party to access the evidence key; or allows a third party limited access to; or to view; or to view and not modify, the evidence key. In an embodiment herein the user's identity data is in the form of an identity hash which further enhances the method and system's security and privacy.

It is believed that such a system allows a balance between anonymity and verifiability for records such as, Covid-19 vaccination records/vaccination status, age verification to enter, for example a bar or other venue, voting registration status, and other situations where a fact needs to be verified, but the user may not want to reveal other information such as their name, address, etc. In such a case, for example, once a third party accesses the reference code, then the third party's device may show the picture of the user, as well as a confirmation that they are fully vaccinated, 21 or over, etc. while typically omitting other information; or other personally-identifiable information which is not necessary to the third party's purpose.

In an embodiment herein the identity source is selected from the group of an identity document, an identity database, and a combination thereof. The identity document may be, for example, selected from the group of a government identification, a private identification, and a combination thereof, or the government identification may be selected from the group of a driver's license, a passport, a tax identification, a citizenship (and/or other legal status) identification, a residency identification, a voter registration identification, a biometric identification, and a combination thereof. The private identification may be selected from the group of a membership identification, a group identification an institutional identification, an affiliation identification, a company identification, and a combination thereof.

In an embodiment herein, the private identification and/or the government identification may be a surrogate identification intended to provide a limited or unlimited level of anonymity, for example a virtual avatar rather than an actual photo, a number rather than a name, etc. which is linked to the user's actual identity. However, others viewing the surrogate identification would only be allowed to pierce the anonymity of the surrogate identification if a certain criteria are met, for example, the user gives specific permission, a court order is provided, etc.

The identity database herein may be, for example, a public identity database, a private identity database, a government identity database, a voter registration database, a medical database, a credit database, a financial database, and a combination thereof, which typically contains a plurality of identity documents.

The remote device may generate a reference code for the stored evidence key and send it to the user, so that the user may reference the stored evidence key. The user may then share the reference doe with a third party to allow the third party to view and/or receive the evidence key, a limited amount of data regarding the user, the user's identity data, the digital document, etc. In an embodiment herein, the reference code may also be sent directly to a third party. In an embodiment herein, the reference code may direct the third party to a website, a standard statement, a digital address, a communication device, and a combination thereof; or a website selected from a public website, a private website, a government website, and a combination thereof. The reference code may be, for example, a QR code, a URL address, a shortened URL link, a UPC code, and a combination thereof.

In an embodiment herein, the digital document is a voting ballot, and the identity document is voter registration identification, such as a voter registration certificate, which may be obtained from, for example, a voter registration database. The method herein may then be used to verify that the user has voted, and/or to even track the progress of the user's vote through the voting system and, for example assure the user that the vote is correctly tallied and/or that the vote has not been tampered with.

In an embodiment herein, the remote device receives a time stamp from a time source, and wherein the remote device does not include the time source; i.e., the time source is separate from the remote device, and typically the time source is also separate from the evidence key generator. Again, it is believed that by receiving the time stamp from a time source; or a time server, that the data integrity of the system and method herein is enhanced.

In an embodiment herein, the invention includes a computer-implemented method for evidencing the existence of a digital document including the steps of obtaining a log of previous cryptographic hashes from a user's system, obtaining a cryptographic hash of the digital document, checking the log to see if the cryptographic hash matches any of the previous cryptographic hashes, and if the cryptographic hash does not match any of the previous cryptographic hashes, then sending the cryptographic hash to a remote device.

It is believed that a user's system may contain a log of previous cryptographic hashes therein and that by checking the cryptographic hash of the digital document against those cryptographic hashes listed in the log, the user's system may be assured to only send new cryptographic hashes to the remote device. This in turn may prevent the remote device from receiving multiple identical cryptographic hashes.

In an embodiment of the method herein, a computer-implemented method for evidencing the existence of a digital document includes the steps of obtaining metadata of a digital document on a user's system, obtaining a cryptographic hash of the digital document, sending the metadata and the cryptographic hash from the user's system to a remote device, receiving the metadata and the cryptographic hash at the remote device, requesting a time stamp from a time source, receiving the time stamp at the remote device from the time source, combining the metadata, the cryptographic hash, and the time stamp to at the remote device in an evidence key generator to generate an evidence key, combining a plurality of evidence keys to form a compound evidence key, storing the compound evidence key to provide a stored compound evidence key, generating a further cryptographic hash of the compound evidence key to form a further evidence key, and storing the further evidence key to form a stored further evidence key. The metadata and the cryptographic hash may be sent to the remote device over the internet. Also, the remote device does not include the time source; i.e., the time source is separate from the remote device, and typically also separate from the evidence key generator, and where the time stamp is based upon the time that the remote device receives the metadata and the cryptographic hash. In such a method, the plurality of evidence keys will typically have been generated by the remote device as well, by repeating the steps which to generate the evidence keys that are combined into the compound evidence key.

Without intending to be limited by theory, it is believed that such a method and the generation and/or use of the further evidence key allows the more efficient storage of evidence keys as further evidence keys, and may also allow, for example, increased granularity and tracking for data analysis and manipulation, allow verification of the data integrity of the evidence key and/or the further evidence key (i.e., that one or both of them have not been tampered with), etc. In an embodiment herein, the plurality of evidence keys is from about 2 to about 1000 evidence keys; or from about 5 to about 100 evidence keys. Thus in an embodiment herein the plurality of evidence keys may be determined by the accumulation of a predetermined number of evidence keys to form the plurality of evidence keys. In an embodiment herein the plurality of evidence keys is determined by the passage of a predetermined period of time, for example from about 0.01 minute to about 1 hour; or from about 0.05 minutes to about 30 minutes; or from about 0.1 minute to about 10 minutes. The predetermined period of time may also be calculated according to computer cycles, or other time measurement methods, as desired. Therefore, all the evidence keys generated within this predetermined period of time would be combined into the plurality of evidence keys to form the compound evidence key.

In an embodiment herein, the method may further include the step of storing compound metadata related to the plurality of evidence keys so as to form the compound evidence key. The compound metadata may be, for example, metadata from each of the individual evidence keys in the plurality of evidence keys, and/or may be metadata relating to the relationship between the plurality of evidence keys, the order of the plurality of evidence keys, etc.

An embodiment of the present invention relates to a method for verifying the data integrity of a digital document including the steps of storing a digital document on a user's system, obtaining metadata of a digital document, typically from the user's system, obtaining a cryptographic hash of the digital document, sending the metadata and the cryptographic hash to a remote device, receiving the metadata and the cryptographic hash at the remote device, requesting a time stamp from a time source, receiving the time stamp at the remote device from the time source, combining the metadata, the cryptographic hash, and the time stamp at the remote device in an evidence key generator to generate an evidence key, and storing the evidence key to provide a stored evidence key. Typically, the remote device does not include the time source; i.e., the time source is separate from the remote device, and typically also separate from the evidence key generator.

In this method, in order for a third party user to verify the data integrity of the digital document, then the third party user could obtain a second cryptographic hash, and optionally second metadata, of the digital document, compare the second cryptographic hash with the cryptographic hash to generate a comparison result which, for example, compares the cryptographic hash and the second cryptographic hash to see if they match, and notifies the third party user of the comparison result. The comparison result may also include, a comparison of not just the cryptographic hash and the second cryptographic hash, but also, for example, the metadata and the second metadata as well as other information.

The digital document subject to the second cryptographic hash may be the same digital document located in the user's system, may be a copy located in the third party user's system, or both. The third party user may obtain the second cryptographic hash within their own third party user's system. During the method herein, the digital document remains within a group selected from the user's system, the user's control, the third party user's system, the third party user's control, and a combination thereof. Without intending to be limited by theory, it is believed that such an arrangement may provide enhanced trust by the third party.

Without intending to be limited by theory, it is believed that such a method verifies the data integrity of the digital document, as the second cryptographic hash would be different than the (first) cryptographic hash of the document has been tampered with or otherwise altered in between the time when the cryptographic hash and the second cryptographic hash are each generated. However, if the digital document has not been tampered with, then the cryptographic hash and the second cryptographic hash would be identical.

In an embodiment herein, the third party user is different from the user. This may be important, when, for example, a third party is downloading software to install on their third party system and they want to make sure the software is pristine and has not been tampered with. In an embodiment herein, the third party user is the same as the user. Such a case may occur when, for example, the user suspects that they have suffered a data breach or an attack and wants to check their own digital documents to make sure that they have not been tampered with.

In an embodiment herein the method herein includes the steps of the third party user obtaining second metadata from the digital document, comparing the second metadata with the metadata, and notifying the third party user whether or not the second metadata matches the metadata. It is believed that this can serve as a double-check of the method herein, to verify the data integrity. It is recognized that the second metadata need not be from the digital document, and thus in an embodiment herein, the second metadata is obtained from the user, the user's system, the evidence key generator, the evidence key, the stored evidence key, the third party user, and a combination thereof.

In an embodiment herein, the method herein may further include the step of making the evidence key; or the cryptographic hash; or both the evidence key and the cryptographic hash, publically-available, either directly or indirectly, and/or at the same time as storing the cryptographic hash and/or the evidence key, or thereafter. The cryptographic hash and/or the evidence key may be made publicly-available, for example, by posting it on a publicly-available website, database, etc. It is believed that by doing so, anyone would be able to easily check the data integrity of the digital document. For example, if the digital document is a software installation package and the user is the software distributor, or a software distribution platform, then the user may wish to make the cryptographic hash; or the evidence key publicly-available, so that third party users who wish to install the software can obtain a second cryptographic hash of the digital document, compare it to the (first) published cryptographic hash so as to check the data integrity of the software before or after the third party downloads it. Thus, the third party can be assured that the software package has not been tampered with before installing it on the third party's system and/or behind their firewall.

In an embodiment herein, the method herein may further include the step of generating a further evidence key from the stored evidence key in a further evidence key generator, and storing the further evidence key to form a stored further evidence key. Such an additional step may be useful in cases where, for example, the third party user wants to verify the data integrity of the digital document, but the user does not (yet) want to provide the third party user with access to the digital document at that time. Then the user may provide the evidence key to the third party user instead of the digital document itself, and the third party user may check the data integrity while assuming that the evidence key is representative of the digital document, its metadata, the time stamp, etc.

It is also recognized herein that the remote device may include a plurality of remote devices.

Turning to the figures, FIG. 1 shows a diagram of an embodiment of the present invention. In FIG. 1, a method, 10, begins with a document, 20, for which an evidence key request, 22, is submitted by, for example, a user, a computer, a system, etc. The evidence key request, 22, may be sent to, an evidence key generator, 24, which is typically a computer program and/or algorithm housed in, for example, a server, a browser, an application, etc. The evidence key generator, 24, then obtains (e.g., generates) one or more time stamps, 26, and obtains (e.g., generates) one or more cryptographic hashes, 28, depending on the embodiment of the invention herein.

The evidence key generator, 24, may employ various methods and input, 30, to generate the evidence key, 32. In an embodiment herein the evidence key generator, 24, then generates one or more evidence keys, 32, based upon the inputs, 30, of the time stamp(s), 26, and/or the cryptographic hash(es), 28; or based upon the time stamp(s), 26, and the cryptographic hash(es), 28. In an embodiment herein, the evidence key generator employs a plurality of time stamps, such as 26 and 26', and the cryptographic hash, 28, to generate an evidence key, 32. In an alternate embodiment, the evidence key generator, 24, employs the time stamp, 26, and a plurality of cryptographic hashes, 28 and 28', to generate an evidence key, 30. In yet another embodiment, the evidence key generator, 24, employs a plurality of time stamps, 26 and 26', as well as a plurality of cryptographic hashes, 28, to generate the evidence key, 30. In yet another embodiment, the evidence key generator, 24, generates multiple evidence keys, 32 and 32', with the same, or different inputs, 30.

The time stamp herein may come from a variety of sources and may be generated according to one or multiple events. In an embodiment herein, the time stamp pertains to the time when the digital document was first created. In an embodiment herein, the time stamp pertains to the time when the digital document was last saved. Thus, in an embodiment herein the time stamp may be part of a version-tracking program for digital documents.

In an embodiment herein, the time stamp pertains to the time when the request of generating an evidence key is received by the evidence key generator. In an embodiment herein, the time stamp pertains to the time when the time when the evidence key generator obtains the cryptographic hash.

In an embodiment herein, the time stamp is a plurality of time stamps; or from about 2 time stamps to about 10 time stamps; or from about 2 time stamps to about 8 time stamps; or from about 3 time stamps to about 6 time stamps. In an embodiment herein, the plurality of time stamps are obtained from different time sources, as described herein; or each of the plurality of time stamps is obtained from a different time source. Without intending to be limited by theory it is believed that such a feature allows greater confidence in the reliability of the entire system when, for example, the evidence key is produced to a third party for evidencing the existence of the digital document at a specific time.

In an embodiment herein the time stamp includes a plurality of time stamps pertaining to a plurality of events; or a plurality of time stamps each of which pertains to a different event. In an embodiment herein, the time stamp pertains to a plurality of different events such as the time when the digital document was first created, the time when the digital document was last saved, the time when the request of generating an evidence key is received by the evidence key generator, the time when the evidence key generator obtains the cryptographic hash, and a combination thereof.

Furthermore, in an embodiment of the present invention, if the plurality of time stamps do not all fall within a pre-determined amount of time, then the evidence key is flagged by the evidence key generator, another algorithm, or another process, as a possible error. In an embodiment herein, the pre-determined amount of time is 10 minutes; or 5 minutes; or 2 minutes.

The cryptographic hash herein is a code; or an alphanumeric code string, which represents the data in the digital document. A cryptographic hash function maps the data in the digital document to provide a specific cryptographic hash for that specific document. The cryptographic hash function herein may be a keyed cryptographic hash generated by a keyed cryptographic hash function or an unkeyed cryptographic hash generated by an unkeyed cryptographic hash function. In an embodiment herein the keyed cryptographic hash function is selected from the group of VMAC, UMAC, BLAKE 2, Poly1305-AES, PMAC, SipHash, One-Key MAC, MD6, HMAC (hash-based message authentication code), and a combination thereof, or and a combination thereof, or BLAKE 2, MAC, HMAC, and a combination thereof.

In an embodiment herein, the unkeyed cryptographic hash function is selected from the group of BLAKE-256, BLAKE-512, BLAKE2b, BLAKE2s, ECOH, GOST, Grøstl, HAS-160, HAVAL, JH, MD2, MD4, MD5, MD6, Radio-Gatnn, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof, or an unkeyed cryptographic hash function selected from the group consisting of SHA-1, SHA-224, SHA-256, SHA-384, SHA-512, SHA-3, and a combination thereof, or an unkeyed cryptographic hash function selected from the group consisting of SHA2-256, SHA2-512, SHA3-256, SHA-3, and a combination thereof.

In an embodiment herein, the cryptographic hash; or plurality of cryptographic hashes is from about 2 to about 100 cryptographic hashes; or from about 2 to about 25 cryptographic hashes; or from about 3 to about 10 cryptographic hashes; or from about 4 to about 8 cryptographic hashes. In an embodiment herein, each of the cryptographic hashes is generated by a different cryptographic hash function. Without intending to be limited by theory, it is believed that the combination of multiple cryptographic hashes provides greater assurance that a collision does not, or will not, occur. One skilled in the art understands that when multiple cryptographic hashes are used, then the chances of a collision decrease exponentially.

Without intending to be limited by theory, it is believed that the use of a cryptographic hash herein, as opposed to other types of hashes, is particularly useful because from the cryptographic hash itself it is extremely difficult, if not impossible, to reconstruct (i.e., reverse-engineer) the digital (i.e., electronic) document and/or the content of the digital document. Thus, just like it is impossible to reverse-engineer a person from a fingerprint, it is impossible to reverse-engineer the digital document from the digital fingerprint. Accordingly, it is believed that with such a benefit, the present invention may be useful in evidencing the existence of trade secrets, while simultaneously reducing the risk of exposure of the trade secret.

The evidence key may be generated with the cryptographic hash(es) and the time stamp(s); or with the cryptographic hash(es), the time stamp(s), and additional input(s). The evidence key may be generated by associating these inputs together or by further modifying them/altering them as desired. For example, in an embodiment herein the cryptographic hash(es), the time stamp(s), and any additional input(s) are further fed into a further hash function to generate a further hash which is then used as the evidence key, either alone or with further data.

Without intending to be limited by theory, it is believed that by using both the cryptographic hash(es) and the time stamp(s) to generate the evidence key it provides greater confidence that one or more of these inputs was not altered at a later time.

As can be seen in FIG. 1, although only two time stamps, 26 and 26', two cryptographic hashes, 28 and 28', and two evidence keys, 32 and 32', etc. are specifically shown, the dotted lines and boxes on the right side of FIG. 1 indicates that additional time stamps, cryptographic hashes, evidence keys, etc. may also be provided, obtained, generated, etc. and such additional features are considered to be within the scope of the invention. Thus, it is clear from FIG. 1 that a single digital document may lead to the generation of a plurality of time stamps, a plurality of cryptographic hashes, a plurality of evidence keys, a plurality of stored evidence keys, etc.

The evidence key, 32, and any optional additional associated data, 34, is then stored together in storage(s), 36, which typically include placing the evidence key and the additional associated data together in a storage media. The additional associated data herein may be included with and/or associated with the evidence key so as to, for example, categorize the evidence key, explain the evidence key, help retrieve the evidence key at a later point in time, help authenticate the evidence key, etc. In an embodiment herein, the additional associated data contains data used to categorize the evidence key. In an embodiment herein, the additional associated data includes a software version number for the version of the software which was used to generate the evidence key. In an embodiment herein, the additional associated data contains data used to search for the evidence key, typically at a time after the storage thereof.

In an embodiment herein the additional associated data contains non-sensitive information, such as information about the evidence key which helps to explain the evidence key, the content thereof, etc., but without actually exposing the detailed contents of the digital document itself. In an embodiment herein, the additional associated data allows the searching of the evidence key using non-sensitive information; or the searching of the evidence key using only non-sensitive information. The additional associated data may be, for example, a storage time stamp (indicating the time that the evidence key was stored), an unique identifier (e.g., an email address, a telephone number, a user name, a password, a server address, an IP address, a device address, etc.), a file name, and a combination thereof, or a storage time stamp, an email address, a telephone number, a user name, a password, a file name, and a combination thereof; or a storage time stamp, an email address, a telephone number, a user name, a file name, a unique identifier, and a combination thereof.

In an embodiment herein, the additional associated data includes metadata.

In an embodiment herein, the additional associated data may be viewed, searched, organized, categorized, etc. by an entity such as, for example, the system administrator, a local administrator, a registered user, and/or the public. In an embodiment herein, different levels and/or categories of entities possess different levels of access permission with respect to the additional associated data and/or the evidence key. For example, a system administrator may have full access permission to view, search, organize, categorize, etc. the additional associated data and the evidence key, whereas the public may only have limited access permission to view only the additional associated data.

In an embodiment herein, no entity at any level has access which allows them to change the additional associated data or the evidence key.

In an embodiment herein, if any change is made to the additional associated data and/or the evidence key, then it is indicated in a log; or a permanent log. In an embodiment herein, the log herein includes a record of the change that is made, as well as one or more indications of, for example, the entity making the change, the date and time the change is made, the location (either physical location and/or the virtual location, via, for example, an IP address) from which the change is made, the access permission needed to make the change, etc.

The password useful herein may be any type of information to identify and/or authenticate a particular user, server, or other entity, particularly one which submits an evidence key request for the original digital document. In an embodiment herein the password is selected from the group of an alphanumeric string, a personal identification factor, a location, a picture, an electronic file, and a combination thereof, or an alphanumeric string, a personal identification factor, a picture, and a combination thereof; or an alphanumeric string, a personal identification factor, and a combination thereof. In an embodiment herein the personal identification factor is a biometric factor such as a fingerprint, a voice print, facial recognition authentication, other personalized pattern, and a combination thereof; or a fingerprint, a voice print, facial recognition authentication, and a combination thereof. The biometric factor herein may comprise biometric information. In an embodiment herein the personal identification factor employs a facial recognition algorithm.

In an embodiment herein, the additional associated data useful herein is case sensitive. In an embodiment herein, the additional associated data useful herein is not case sensitive. In an embodiment herein, the password, file name, IP address, etc. is case-sensitive. In an embodiment herein, the password, file name, IP address, etc. is not case-sensitive.

In FIG. 1, it can be seen that the evidence key, 23, and the additional associated data, 34, are combined and stored together in the storage, 36, 36', etc. so as to provide one or more stored evidence keys, 38, 38', etc. The storage herein employs a storage media; or a plurality of storage media, to store the stored evidence key(s). The information such as the evidence key, 32, and the additional associated data, 34, is typically stored in a database in the storage, 36, 36', etc. and/or the storage media herein.

The storage media useful herein include those selected from the group of a server, a storage drive, paper, a CD-ROM, a DVD, a single-use storage media, and a combination thereof, or a server, a storage drive, a CD-ROM, a DVD, a single-use storage media, and a combination thereof; or a server, a storage drive, a CD-ROM, a DVD, and a combination thereof. In an embodiment herein the storage drive is selected from the group of a disk drive, a flash memory, a magnetic tape, and a combination thereof; or a hard disk, a floppy disk, a magneto-optical disk, a flash memory, a magnetic tape, an optical storage media, a solid state storage media, a 5D data storage, a waterproof glass 'disk' and a combination thereof; or a hard disk, a flash memory, and a combination thereof.

In an embodiment herein, the method and/or system herein comprises a plurality of storage media.

In an embodiment herein, the plurality of storage media; or each of the plurality of storage media, is located in a different physical location. Without intending to be limited by theory, it is believed that such a dispersed system provides business continuity and disaster-control benefits in case of events such as, for example, natural disasters, power outages, war, political unrest, etc. Furthermore, in an embodiment herein, one or more of the plurality of storage media and/or its data is held by an organization such as a trusted organization; or a trusted international organization; or a non-partisan organization; or a non-profit organization; or a national patent office; or a social enterprise. In an embodiment herein, the organization is selected from the group consisting of The Austrian Patent Office (APO), The China Council for the Promotion of International trade (CCPIT), The European Patent Office (EPO), The Intellectual Property Office of Singapore (IPOS), The International Intellectual Property Commercialization Council (IIPCC), The China National Intellectual Property Administration (CNIPA, a.k.a. The Chinese Intellectual Property Office), The Swiss Federal Institute of Intellectual Property (FIIP), the United States Patent and Trademark Office (USPTO), The State Market Supervision Administration (SMSA in China), The World Intellectual Property Office (WIPO), the United States Library of Congress, and a combination thereof, or The Intellectual Property Office of Singapore (IPOS), The International Intellectual Property Commercialization Council (IIPCC), The World Intellectual Property Office (WIPO), the United States Library of Congress, The State Market Supervision Administration (SMSA in China), and a combination thereof. In the case where an organization either changes it name, as merged, absorbed, divested, etc., then the term "organization" as used herein includes their respective successor(s) in interest.

In an embodiment herein, the plurality storage media herein are electronically-separated and physically-separated from each other. Without intending to be limited by theory, it is believed that such a system provides improved security and reliability as compared to a comparable inter-networked system and/or a system having only a single physical location. Such a system dispersed to multiple locations may also provide a reliable backup in case, for example, one of the locations is hacked, altered, held for ransom, etc.

In FIG. 1 it can be seen that in an embodiment herein, the method may include a delivery step, 40, 40', etc., in which the evidence key, 32, and/or the additional associated data, 43, is delivered to a party; or is delivered to the party, organization, server, account, etc. that originally made the evidence key request, 22, to form a delivered evidence key, 42, 42', etc. In an embodiment herein, the delivery step, 40, includes the delivery of the evidence key, 32, and additional associated data, 34, to the account that originally made the evidence key request, 22. Such a delivery may be via a route such as, for example, email, text message, electronic messaging service, postal mail, transmission over the internet, and a combination thereof, or via email, postal mail, text message, and a combination thereof. Without intending to be limited by theory, it is believed that such a delivery will help to increase the likelihood that, in the case that retrieval is requested, the requester will be able to provide sufficient information to be able to successfully retrieve the stored evidence key.

In FIG. 1 the storage, 36', is shown as being in parallel with storage 36. However, in an embodiment of the present invention, the storage, 36', is in sequence with storage 36 (see, for example, FIG. 3).

Figure 2:
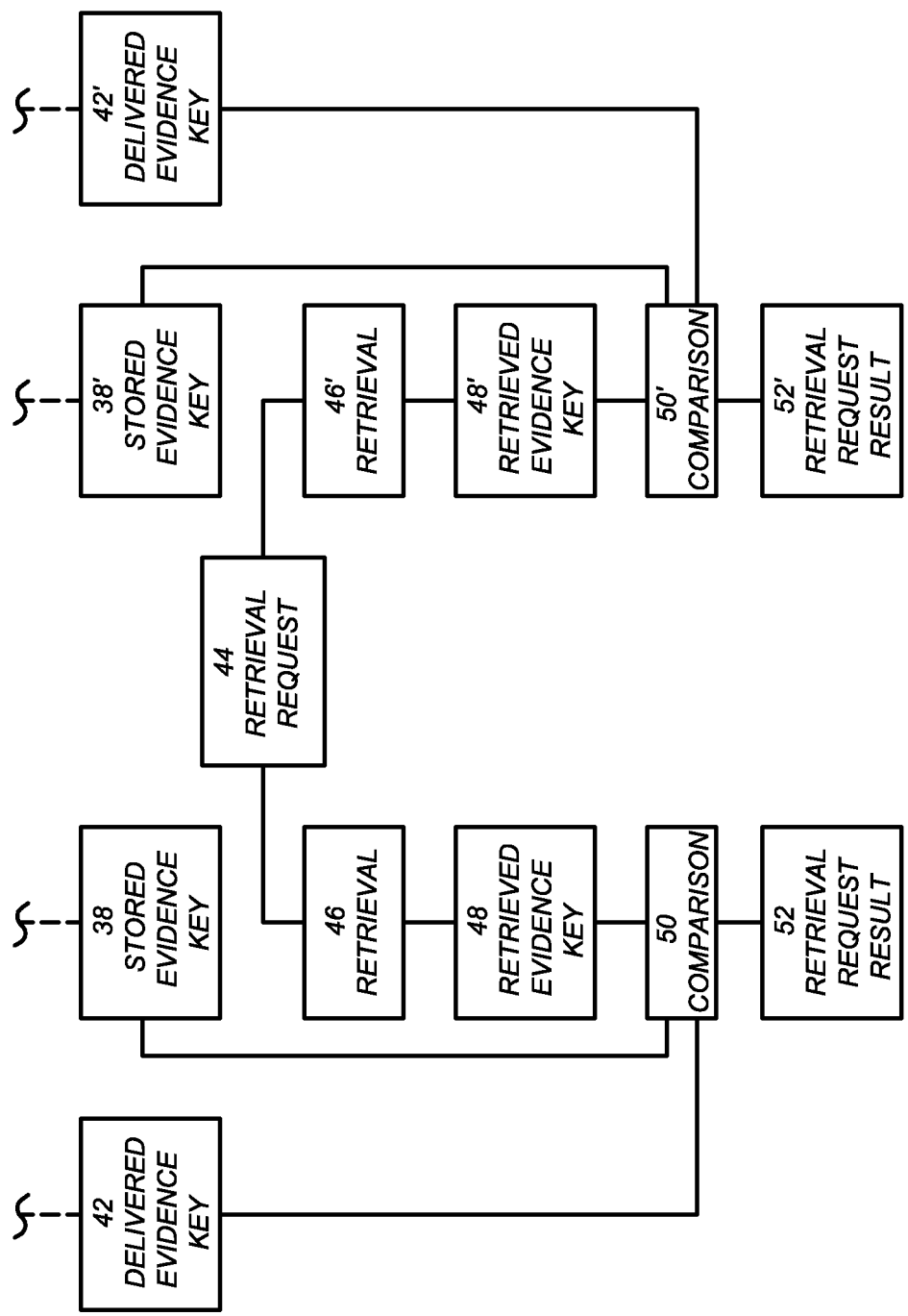
FIG. 2 shows a diagram of the embodiment of the invention including a retrieval request.

FIG. 2 shows a diagram of an embodiment of the invention herein, wherein the computer-implemented method herein includes a retrieval request, 44, that then initiates a retrieval step, 44, 44', etc. The retrieval step, 44, initiates a process whereby the system retrieves the evidence key, and/or any additional associated data to form a retrieved evidence key, 48, 48', etc. This retrieved evidence key, 48, may then be subject to a comparison step, 50, 50', etc. where the retrieved evidence key, 48, is compared with the stored evidence key, 38, and/or the delivered evidence key, 42. In an embodiment herein, the comparison step results in a retrieval request result, 52, 52', etc. In an embodiment herein, the comparison step, 50, compares the delivered evidence key, 42, (and any additional associated data (see FIG. 1 at 34)) with the retrieved evidence key, 48 (and any respective additional associated data). The comparison step, 50, may then highlight in the retrieval request result, 52, whether there were any discrepancies between the delivered evidence key, 42, and the retrieved evidence key, 48, or whether they match up.

Without intending to be limited by theory, it is believed that if the delivered evidence key, 42, and the retrieved evidence key, 48, match up, then they may serve as proof, or a rebuttable presumption of proof, that the digital document existed and/or was in the possession of a party at a certain point in time, such as when the evidence key request was submitted.

One skilled in the art understands that in FIG. 2, similar parallel processes for the retrieval step, 46', the stored evidence key, 38', are contemplated for embodiments of the invention herein. Without intending to be limited by theory it is believed that having such a parallel retrieval, 46', comparison, 50', etc. provides an added layer of security and assurance to the users that the method and system are sound and that the data integrity is intact. Conversely, if different results are retrieved from the parallel processes, then it may indicate that the data integrity has been compromised in some way. In an embodiment of the invention, when different results are retrieved, a log is generated, an entity, such as a system administrator, is notified, or a combination thereof.

Figure 3:
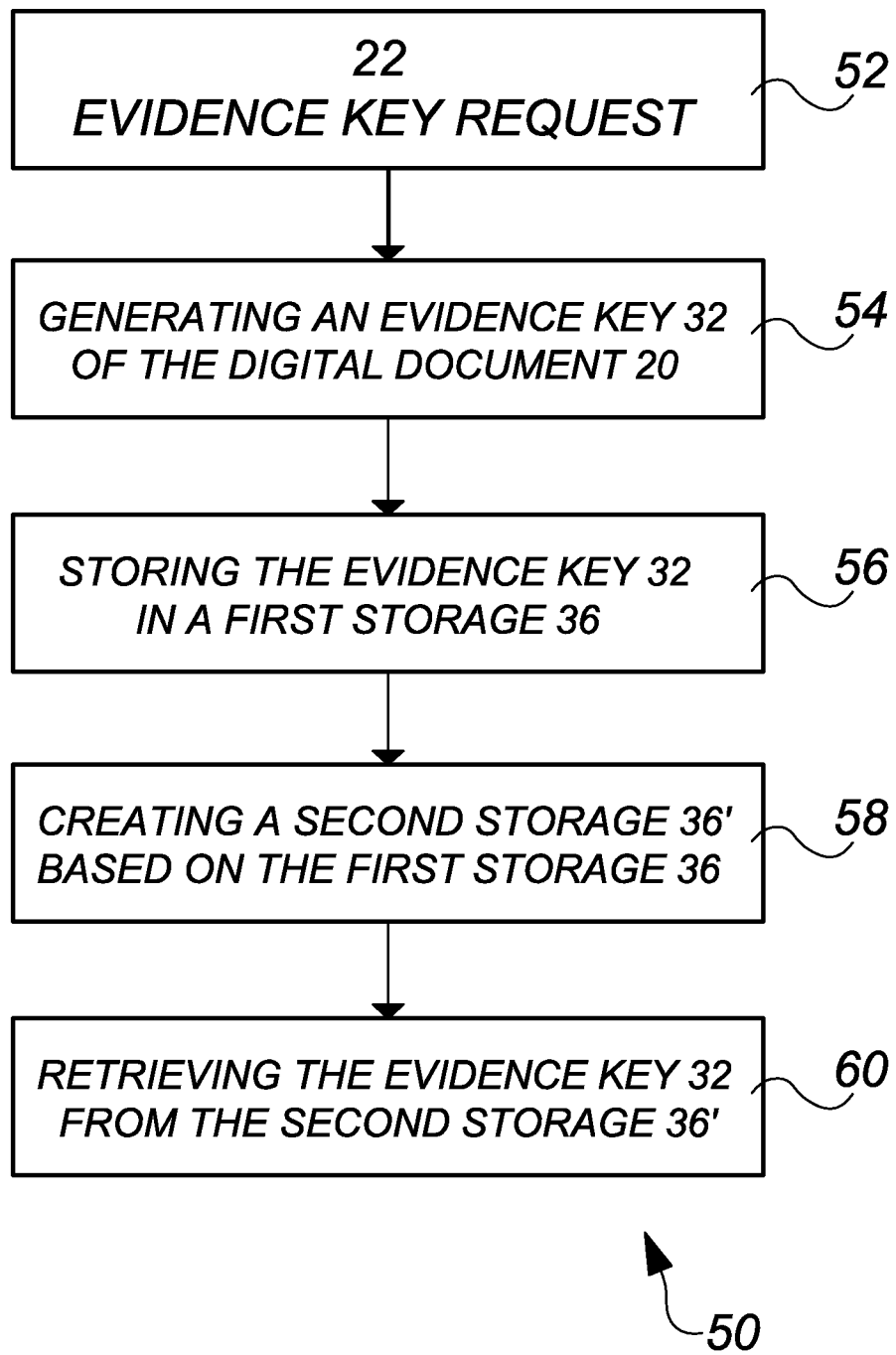
FIG. 3 shows a flow diagram of a method of evidencing the existence of a digital document according to one embodiment of the present invention.

FIG. 3 shows a flow diagram of a computer-implemented method of evidencing the existence of a digital document according to one embodiment of the present invention. Specifically, a flow diagram of a method, 50, of evidencing the existence of a digital document, 20, where in a first step, 52 of the method, 50, an evidence key request, 22, is received. As noted herein, the evidence key request is a request from a user to generate an evidence key for a digital document (see FIG. 1 at 20). An evidence key, 32, is then generated in step 54 by the evidence key generator (see FIG. 1 at 24). Once the evidence key, 32, is generated, it, along with any additional associated data (sew FIG. 1 at 34) will be stored in a first storage, 36, as shown in step 56. In this embodiment, based on the first storage, (see FIG. 1 at 36), a second storage, 36', is created in step 58. Thus, the first storage, 36, and the second storage, 36', are in sequential arrangement, not in parallel as seen in FIG. 1. In an embodiment herein, the first storage, 36, and the second storage, 36', are located in different independent servers. During, for instance, disputes arising out of who created the file first or who copied whom, access may be granted to the user, the owner, and/or any relevant third parties to retrieve the evidence key, 32, and any additional associated data (see FIG. 1 at 34) from the second storage, 36'. The retrieval of the evidence key, 32, and any additional associated data (see FIG. 1 at 34), may be conducted by methods and algorithms known in the art, such as a search engine running on, for example, storage, 36, 36', etc.

Figure 4:
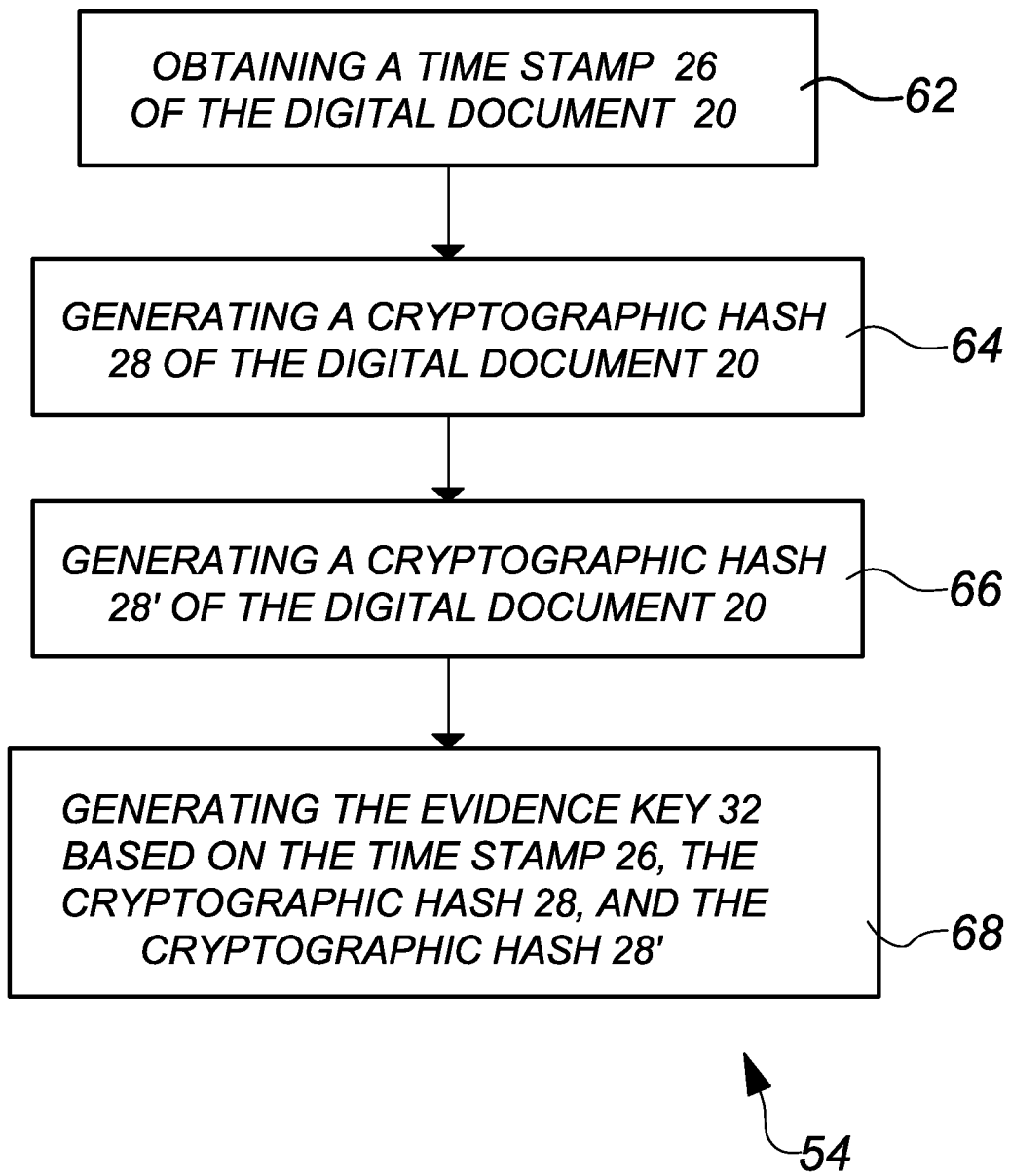
FIG. 4 shows a detailed flow diagram of step 54 of the method according to the embodiment as shown in FIG. 3.

FIG. 4 is a detailed flow diagram of step 54 of computer-implemented method 50 according to the embodiment as shown in FIG. 3. In step 62, a time stamp, 26, of the digital document, 20, is obtained. Afterwards, in step 64, a cryptographic hash, 28, is generated based on a cryptographic hash function. In a specific embodiment, the cryptographic hash function is a unkeyed cryptographic hash function selected from a group of SHA2-256, SHA2-512 and SHA3-256. In step 66, a cryptographic hash, 28', is generated based on a (second) cryptographic hash function that is different from the (first) cryptographic hash function that generated cryptographic hash, 28. In one embodiment of the present invention, the (second) cryptographic hash function is a hash function selected from a group consisting of SHA2-256, SHA2-512 and SHA3-256. In step 68, after obtaining the time stamp, 26, the cryptographic hash, 28, and cryptographic hash, 28', the evidence key, 32, is generated based on the time stamp, 26, the cryptographic hash, 28, and cryptographic hash, 28'.

Figure 5:
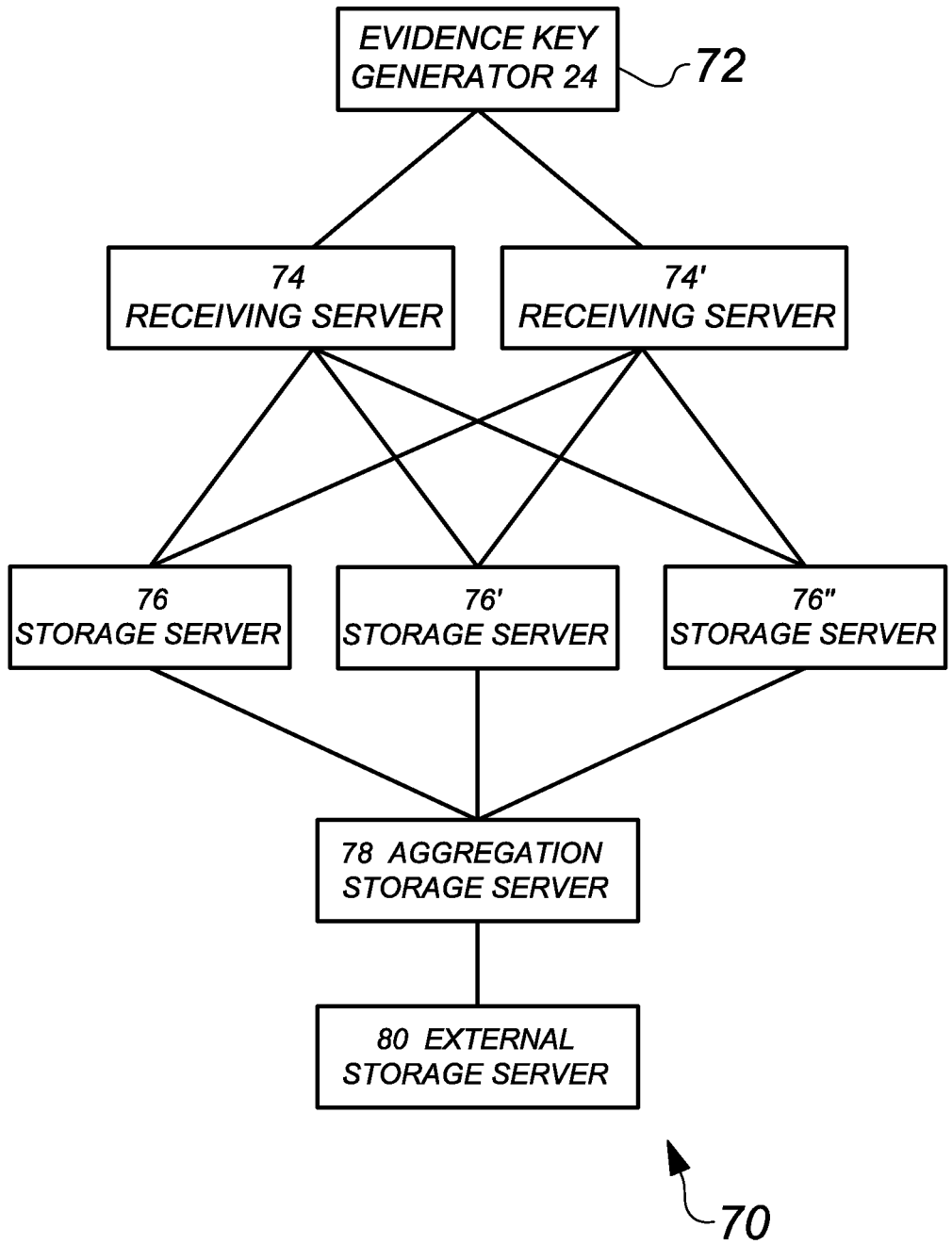
FIG. 5 shows an embodiment of a system of the present invention for evidencing the existence of a digital document.

FIG. 5 shows another embodiment of the present invention is directed to a computer system, 70, for evidencing the existence of a digital document, 20. The system, 70, includes an evidence key generator, 24, in the user's system, 72, configured to generate an evidence key, 32, of a digital document, 20, according to, for example, the step 54 of method 50 in FIG. 3. The system, 70, further includes (first) receiving server, 74, and (second) receiving server, 74', configured to receive the evidence key (see FIG. 1 at 32) once it is generated by the evidence key generator, 24. Each receiving server, 74 and 74', is independently coupled with (first) storage server, 76, (second) storage server, 76', and (third) storage server, 76". Each storage server, 76, 76', and 76", stores the evidence key (see FIG. 1 at 32) in its own database. Each storage server, 76, 76', and 76", is independently coupled with a aggregation storage server, 78. After receiving database and server identification from each of the storage servers, 76, 76', and 76", the aggregation storage server, 78, is configured to create a second database based on a new time stamp and the received information from the storage servers, 76, 76', and 76".

In an embodiment of the present invention, the new time stamp is the time when the aggregation storage server, 78, receives a particular evidence key, 32. In one embodiment, the evidence key generator, 24, is configured to send an evidence key (see FIG. 1 at 32) to receiving server, 74, and receiving server, 74', immediately after the evidence key (see FIG. 1 at 32) is generated. In another embodiment, the storage servers, 76, 76', and 76", are configured to send their own respective databases to the aggregation storage server, 78, in batch mode.

The system, 70, further includes an external storage server, 80, which is a mirror of the aggregation storage server, 78. In an embodiment, the external storage server, 80, is not accessible to any user of the system, 70, and serves as a disaster recovery backup. In yet another embodiment, a search engine (not shown in FIG. 5) is coupled with the aggregation storage server, 78, and/or the external storage server, 80, thereby allowing the user or any relevant third parties to retrieve the evidence key, 32, and any additional associated data (see FIG. 1 at 34) of a particular digital document upon request.

According to an embodiment of the present invention, the database includes for each evidence key, the entries as shown in Table 1.

TABLE 1

| Database Structure | |
|---|---|
| Entry | Remark |
| Cryptographic hash | at least 200 bits long |
| Time stamp | at least up to one-minute accuracy |
| Additional associated data: | |
| Digital File Size | no restriction in length |
| Digital File Name | NIL |
| User Identification | includes an user email address, a phone number and/or a biometric factor |
| Storage Server Identification | NIL |
| Evidence Key Version | NIL |
| Remarks | NIL |

In Table 1, the evidence key is any combination of the time stamp(s), cryptographic hash(es) and/or the additional associated data.

In an embodiment herein, a second database includes the new time stamp and all the entries of the (first) database. In yet another embodiment, the system, 70, further includes a file property editor configured to obtain the digital file size and digital file name.

In another embodiment, the system, 70, further includes a biometric sensor configured to capture at least one biometric factor of the user for authentication purposes.

Figure 6:
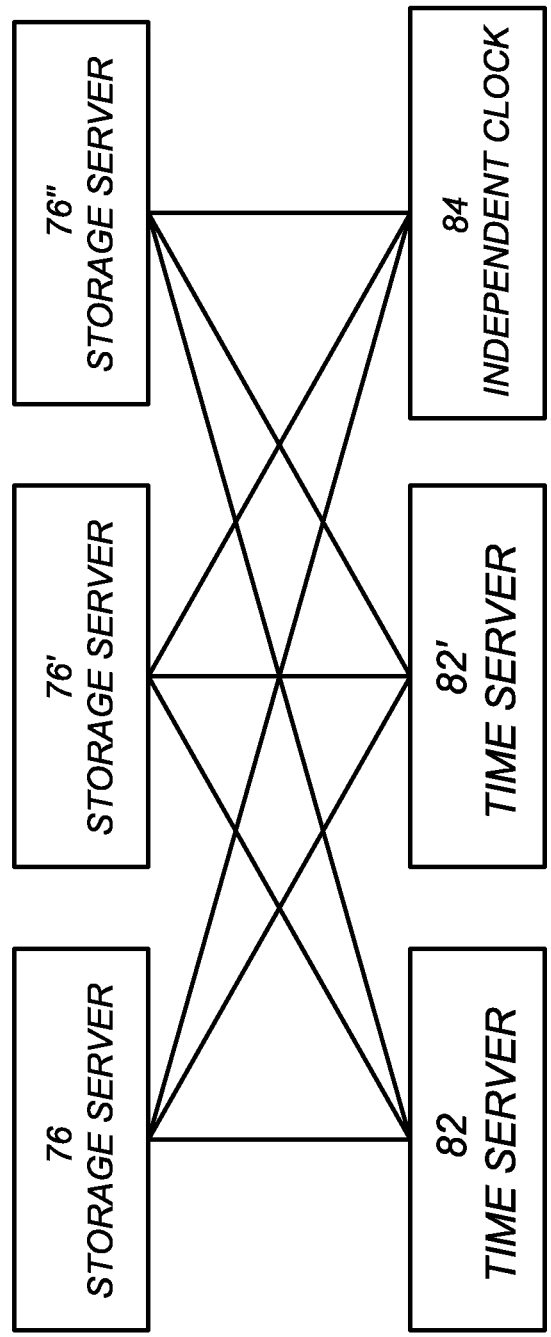
FIG. 6 shows an embodiment of the invention describing a method to synchronize the clocks of the storage servers.

FIG. 6 shows an embodiment of the invention describing a computer-implemented method to synchronize the clocks of the storage servers, 76, 76', 76", etc. Each of the storage servers, 76, 76', 76", are independently coupled with time server, 82, time server, 82', and an independent clock, 84. When the storage server, 76, 76', 76", receives an evidence key (see FIG. 1 at 32) from the evidence key generator (see FIG. 1 at 24), it requests a time stamp from time server, 82, time server, 82', and independent clock, 84, respectively. The storage server, 76, 76', 76", is further configured to assign into the database, as, for example, additional associated data, the earliest time stamp received from the time server, 82, the second time server, 82', and the independent clock, 84 as the acceptance time of that particular evidence key (see FIG. 1 at 32). In one embodiment, both time server, 82, and time server, 82', adopt Network Time Protocol whereas the independent clock, 84, is a GPS clock.

Figure 7:
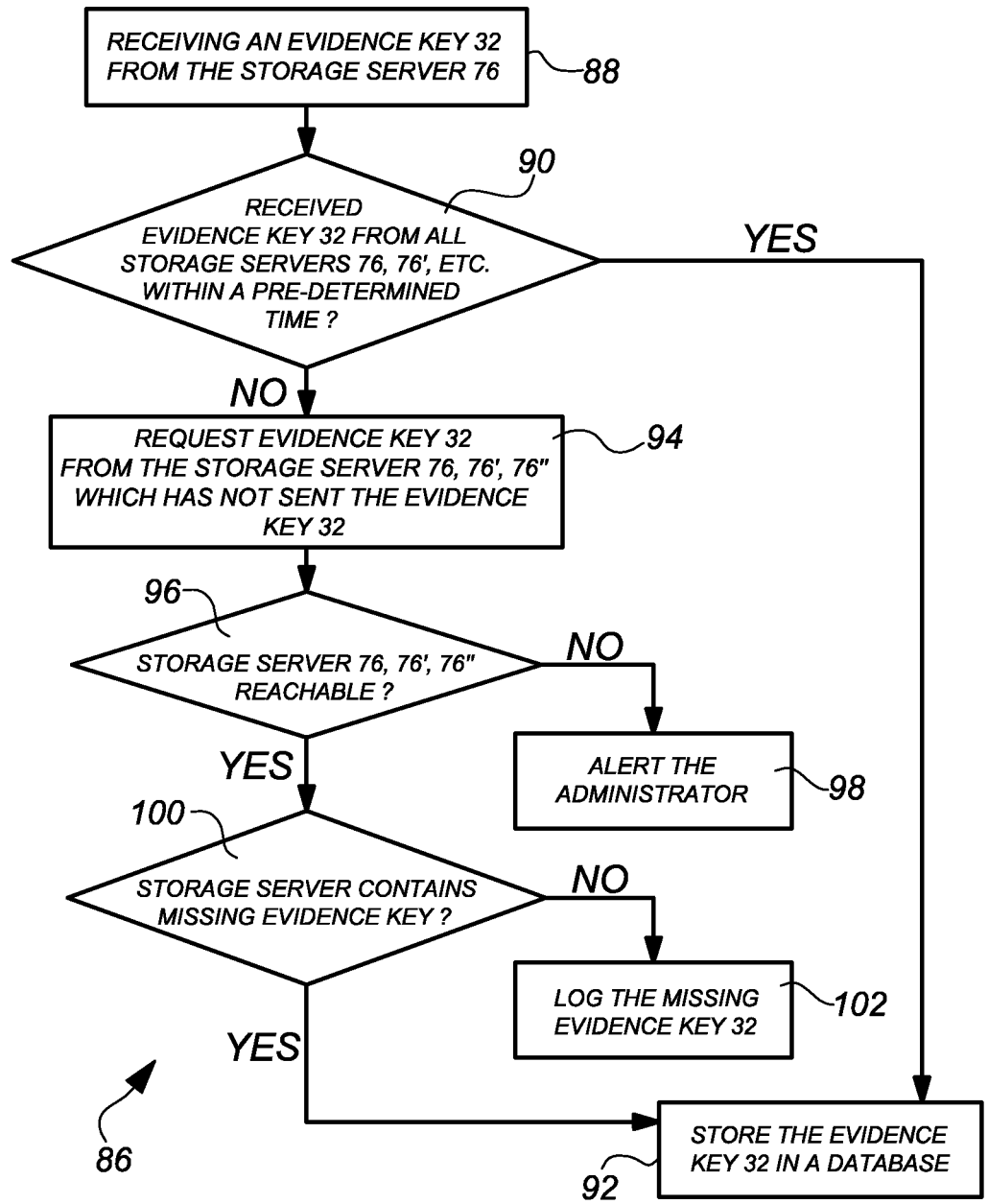
FIG. 7 shows an algorithm structure according to an embodiment of the present invention.

FIG. 7 shows an algorithm structure, 86, according to an embodiment of the present invention. The algorithm, 86, is implemented in the aggregation storage server (see FIG. 5 at 78) to ensure the data integrity. When the storage servers, 76, 76', 76", etc., send the evidence key(s) to the aggregation storage server (see FIG. 5 at 78) in step 88, the aggregation storage server (see FIG. 5 at 78) determines if it receives the corresponding evidence key from all storage servers, 76, 76', 76", etc. within a pre-determined time (condition 90). If the aggregation storage server (see FIG. 5 at 78) does receive the corresponding evidence key from all storage servers, 76, 76', 76", etc., within the pre-determined period of time, then the evidence key will be stored in the database located at the aggregation storage server (see FIG. 5 at 78) in step 92.

On the other hand, if the aggregation server (see FIG. 5 at 78) does not receive the corresponding evidence key from any one of the storage servers, 76, 76', 76", etc., within the pre-determined time, then in step 94 the aggregation storage server (see FIG. 5 at 78) will specifically request the missing evidence key from that particular storage server(s) whose corresponding evidence key is missing or late. In step 96, the aggregation storage server (see FIG. 5 at 78) checks to see whether that particular storage server, 76, is reachable. If the particular storage server, 76, 76', 76", etc., is not reachable, then in step 98, the aggregation storage server (see FIG. 5 at 78) alerts the administrator of the system (see FIG. 5 at 70). Alternatively, the aggregation storage server may note this in an error log, or otherwise note the discrepancy. However, if the storage server, 76, 76', 76", etc., is reachable, then that particular storage server, 76, will check if the missing evidence key, 32, exists in its own database and, if found (condition 100), then the particular storage server, 76, will send the missing evidence key, 32, to the aggregation storage server (see FIG. 5 at 78). The aggregation storage server (see FIG. 5 at 78) will then in step 92, aggregation storage server will store the evidence key, 32, in the aggregation storage server's database (step 92).

If the missing evidence key, 32, cannot be found in that particular storage server, 76, (condition 100), then in step 102, a log regarding the missing evidence key, 32 will be saved in, for example, an error log.

Figure 8B:
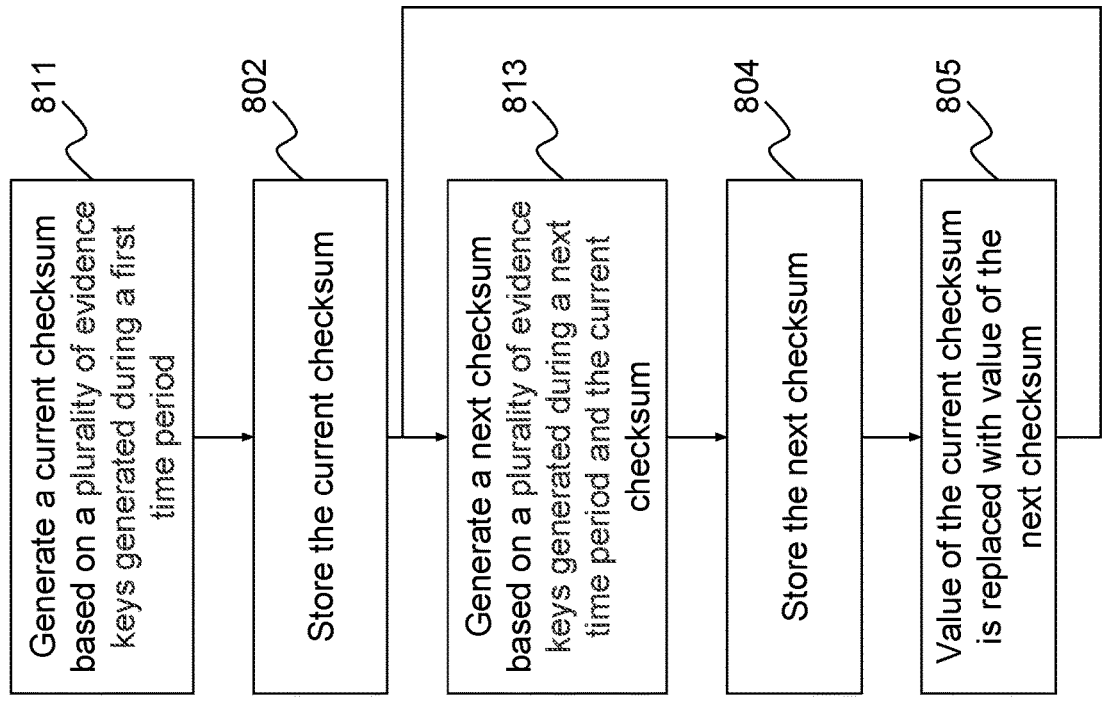
FIG. 8B shows another embodiment of the present invention generating a checksum.
Figure 8A:
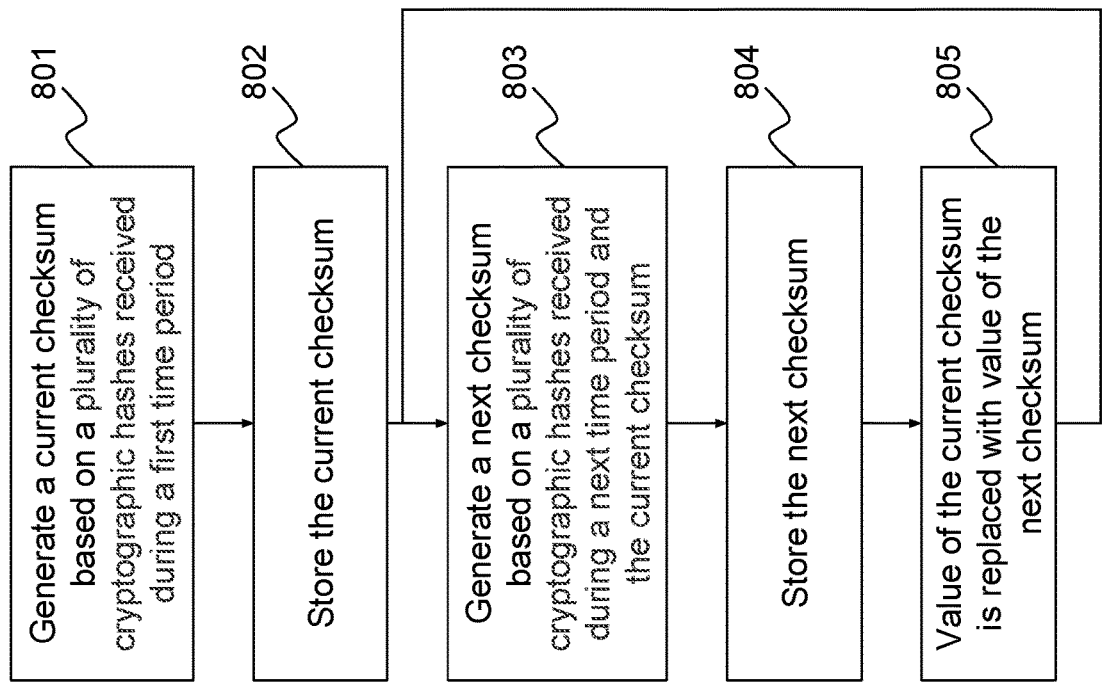
FIG. 8A shows an embodiment of the present invention generating a checksum.

FIG. 8A shows an embodiment of a computer-implemented method of the present invention for generating a checksum. At step 801, a current checksum is generated based on a plurality of cryptographic hashes, or one cryptographic hash, received during a first time period. The first time period is in the range from about a few milliseconds to about a month. The shorter the first time period, the earlier the current checksum will be generated (i.e., a shorter time between generating checksums) and the greater the load that will be required on the computing resources as more checksums will be generated and stored. The longer the first time period, the later the current checksum will be generated (i.e., a longer time between generating checksums) and the lower the load will be on the computing resources as fewer checksums will be generated and stored. The checksums are used to ensure integrity of the plurality of cryptographic hashes stored. For example, in order to detect if one or more of the cryptographic hashes stored, for example in a database, are changed or tampered with, the cryptographic hashes are used to create a second checksum. If the original checksum does not match the second checksum, then this indicates at least one of cryptographic hashes stored in the database have been changed or tampered.

One skilled in the art understands that there are myriad ways to generate the checksums. For example, the checksum can be generated using, for example, a cryptographic hash algorithm, a block parity function, a cyclic redundancy check (CRC), and a combination thereof. It is preferred to use a cryptographic hash function such as SHA2 and/or SHA3 to generate the checksum so that the probability of a hash collision is comparatively low.

In one example, the first time period is one minute.

For illustration purposes only, there may be, for example, one hundred cryptographic hashes received during the first time period. A string is first generated by concatenating the one hundred cryptographic hashes in the chronological order in which they are received. The current checksum is then generated by, for example, applying a SHA2-256 hash function on the string. In one example, the string is in hexadecimal format. In another the string is in base 64 format.

At step 802, the current checksum is stored in a storage media, as discussed herein. The checksum is typically stored in a non-volatile storage media (i.e., a non-volatile computer readable storage media) and maintained preferably for a period of time, for example, many years, or even indefinitely. As the plurality of cryptographic hashes and corresponding evidence keys may be used as court evidence years later, the checksums should also be stored for years, or indefinitely, in order to further prove that none of the plurality of cryptographic hashes and corresponding evidence keys has been changed or tempered.

At step 803, a next checksum is generated based on another plurality of cryptographic hashes received during a next time period and the current hash. In one embodiment herein, the next time period is one minute and began upon the end of the first time period.

For illustration purposes only, there may be, for example, thirty cryptographic hashes received during the next time period. A string is first generated by concatenating the thirty hundred cryptographic hashes in the chronological order in which they were received and the current checksum. The next checksum is generated by, for example, applying a SHA2-256 hash function on the string.

At step 804, the next checksum is stored as in the same manner as the current checksum stored in step 802. At step 805, the value of the current checksum is updated and replaced with value of the next checksum. The updated current checksum is then used for generating another next checksum in a future next time period. In an embodiment herein, step 805 is performed before step 804 and the current checksum is stored in step 804 instead.

As the next checksum is generated partially based on the current checksum and the current checksum is also generated partially based on past checksums, then the next checksum is also generated partially based on past checksums. Even in the case where one or more of past checksums are lost or not stored, in an embodiment herein it is believed that the current checksum can still be regenerated using all the received plurality of cryptographic hashes. One skilled in the art understands that by comparing the regenerated checksums and stored past checksums, the integrity of the plurality of cryptographic hashes stored can then be verified.

In an embodiment of the invention, at steps 801 and 803, instead of generating a current checksum and a next checksum on a time basis, the generation is based on a predetermined number of cryptographic hashes received. For example, a checksum is generated for every three hundred cryptographic hashes received.

FIG. 8B shows an embodiment of a computer-implemented method of the present invention for generating a checksum. The steps in FIG. 8B are similar to the steps in FIG. 8A. Steps 801 and 803 are replaced by steps 811 and 813 respectively. Compared to steps 801, a current checksum is generated based on a plurality of evidence keys generated during a first time period at step 811, instead of based on a plurality of cryptographic hashes as in FIG. 8A. Similarly, a next checksum is generated based on a plurality of evidence keys generated during a next time period at step 813. As evidence keys are based on a time stamp and a plurality of cryptographic hashes, or a single cryptographic hash, a checksum can further be used to verify that the time stamp, the plurality of cryptographic hashes and/or the additional associated data stored in evidence key have not been changed and/or tampered with.

Figure 9:
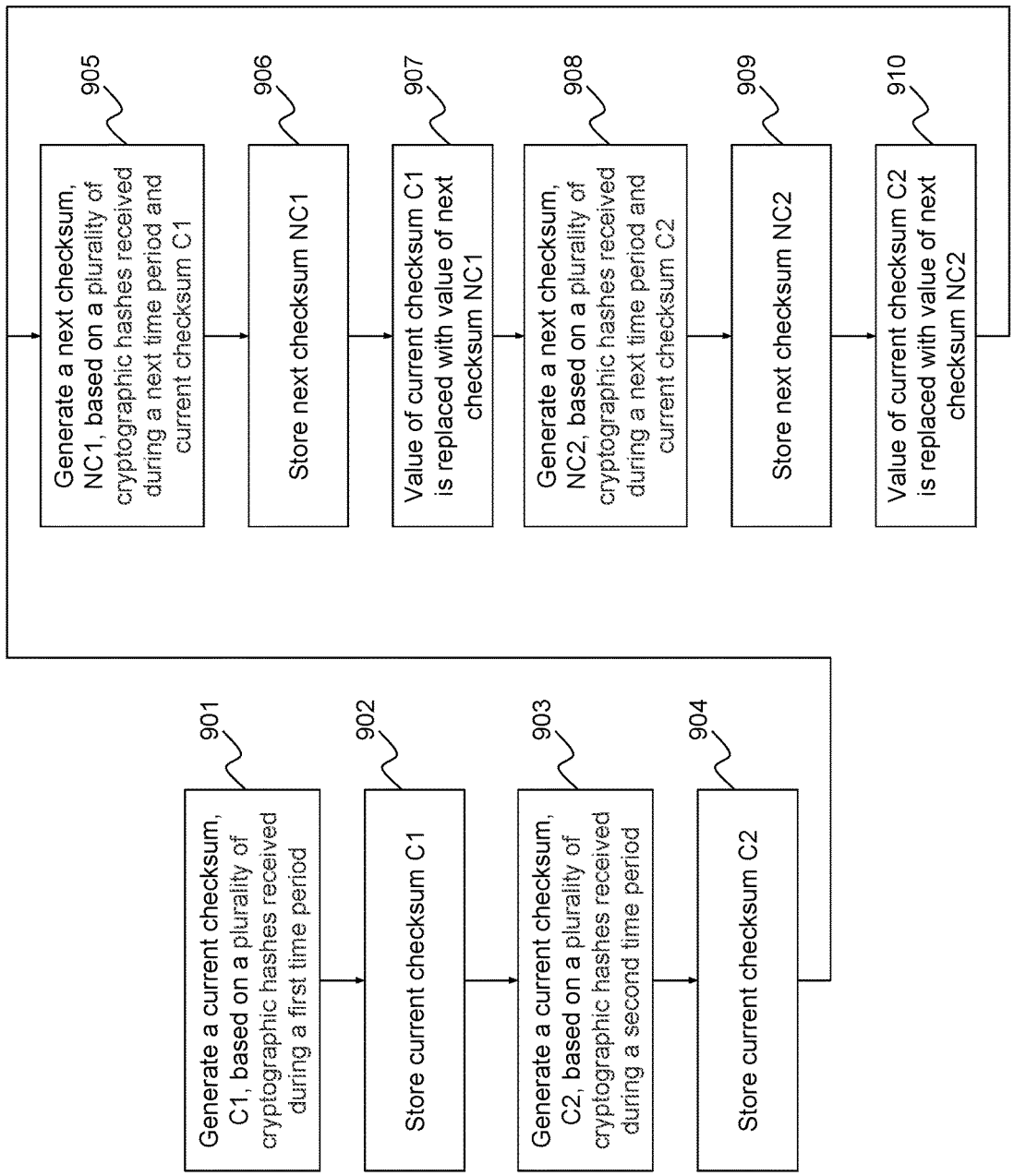
FIG. 9 shows another embodiment of the present invention generating a checksum.

FIG. 9 shows another embodiment of a computer-implemented method of the present invention for generating a checksum. A plurality of current checksums, for example C1 and C2, are used to generate next checksums NC1 and NC2 respectively. At step 901, current checksum C1, is generated based on a plurality of cryptographic hashes, or one cryptographic hash, received during a first time period. At step 902, current checksum C1 is stored in a storage media. At step 903, another current checksum, C2, is generated based on a plurality of cryptographic hashes, or one cryptographic hash, received during a second time period. At step 904, the current checksum C2 is stored as in the same manner as the current checksum stored in steps 902.

The generation of current checksum C2 is not based on current checksum C1 and the plurality of cryptographic hashes, or one cryptographic hash, received during the first time period. Therefore while current checksum C1 is being computed at 901 and being stored at step 902, current checksum C2 is independently generated without using any information of current checksum C1, such as the plurality of cryptographic hashes, or one cryptographic hash, received during the first time period. As current checksum C1 is being processed in a processing unit of the system, such as central processing unit, the cryptographic hashes may have already arrived during the second time period, and so on.

In an embodiment herein, by the time current checksum C1 is generated, the second time period may have ended and a third time period may have already been started. In order to allow more time to calculate the current checksums, a plurality of current checksums are used. Accordingly one skilled in the art understands that there is no actual limit that only two current checksums, C1 and C2, can be used, but this embodiment is described as such merely for ease of understanding. More current checksums, for example, about 5 current checksums; or about 7 current checksums; or about 10 current checksums; or about 25 current checksums; or about 50 current checksums; or about 100 current checksums, can be used to further lengthen the time allowed to calculate current checksums.

At step 905, a next checksum NC1, is generated based on another plurality of cryptographic hashes received during a next time period and current checksum C1. Next checksum NC1 is generated without using information of current checksum C2, the plurality of cryptographic hashes, or one cryptographic hash, received during the second time period. Therefore, the computing/processing unit of the system has more time to generate current checksum C2.

At step 906, the next checksum NC1 is stored as in the same manner as the current checksum is stored in step 902. At step 907, the value of the current checksum C1 is updated and replaced with the value of the next checksum NC1.

At step 908, a next checksum NC2, is generated based on another plurality of cryptographic hashes received during a next time period and current checksum C2. Next checksum NC2 is generated without using any information from the current checksum NC1, such as the plurality of cryptographic hashes, or one cryptographic hash, received during the time period of step 905-906. Therefore, processing unit of the system has more time to generate current checksum NC1.

At step 909, another next checksum NC2 is stored in the same manner as the current checksum was stored in steps 902 and 904. At step 910, the value of the current checksum C2 is updated and replaced with value of the next checksum NC2.

When more time is required for generating the next checksum, then steps 905-910 can be further extended, for example, to have next checksums NC3, NC4, NC5, etc.

In an embodiment herein, the methods herein, such as, for example described in FIGS. 8A, 8B, and 9, the iterative checksum generation and replacement steps essentially outline the steps of a blockchain which functions to authenticate the integrity of the database formed thereby.

In an embodiment herein, the current checksum 802 is an initial coin offering (ICO); or the ICO is a cryptocurrency; or the cryptocurrency is Bitcoin, Litecoin, Namecoin, SwiftCoin, bytecoin, peercoin, dogecoin, Emercoin, Feathercoin, Gridcoin, Primecoin, Ripple, Next, Auroracoin, Dash, NEO, MazaCoin, Monero, NEM, PotCoin, Synero AMP, Titcoin, Verge, Stellar, Vercoin, Ethereum, Ethereum Classic, Tether, Decred, Waves platform, Zcash, BitConnect, Bitcoin Cash, EOS IO, Cadano, Petro, Petro Gold, Inu Shiba, etc. The generation of a next checksum 804 and replacement of the current checksum 802 with the next checksum 804 is essentially treated as a transaction and is recorded in the database. The database in turn may be stored on, for example, a storage server (e.g., see FIG. 5 at 76, 778, 80, etc.) or a ledger stored on a server or computer system.

In an embodiment herein of FIG. 9 herein, the first time period, the second time period, etc. are alternating predetermined periods of time, and/or are arranged to a mutually-exclusive, alternating schedule.

The method herein may be implemented by a computer. Furthermore, the system herein may be a computer system.

Figure 10:
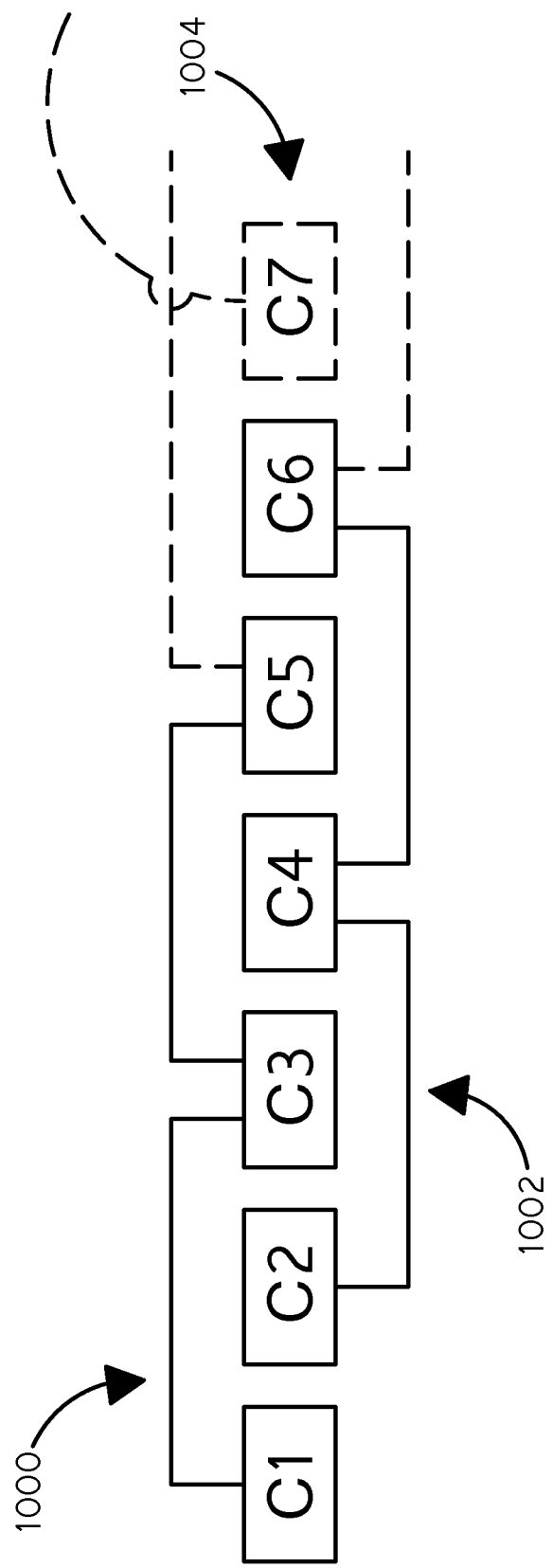
FIG. 10 shows a schematic diagram of a tag chain embodiment of the present invention.

FIG. 10 shows a schematic diagram of a tag (block) chain embodiment of the invention herein. In FIG. 10, a computer-implemented first blockchain 1000 is initiated when a first link C1 is generated; typically a checksum generated via a cryptographic hash. The link herein may be a single checksum, or a plurality of checksums. The link herein may be and/or represent, for example, a single transaction, a plurality of transactions, a transfer, a plurality of transfers, a period of time, a device (e.g., an electronic device) or a plurality of devices, etc., and a combination thereof, or, for example, a plurality of transactions that occur during a period of time. A second blockchain 1002 is initiated when a link C2 is generated; typically a checksum generated via a cryptographic hash. Assuming for this embodiment that each link is a single checksum, then in contrast to the typical blockchain, in the embodied tag chain, checksum C1 does not link to checksum C2 to form the next link in the chain. Instead, checksum C1 links to checksum C3 and then to checksum C5, etc. Similarly checksum C2 links to checksum C4 and then to checksum C6, etc. In the embodiment of FIG. 10, a third blockchain 1004 whose first block is checksum C7, is added to the tag chain system after the first blockchain 1000 and the second blockchain 1002 have already been established. In an embodiment herein, a plurality of blockchains are added to the tag chain system after a plurality of blockchains already exist within the tag chain system.

In the schematic representation of FIG. 10, each checksum indicates a single link in a chain, 1000, 1002, 1004, etc. Thus, all of the odd checksums from C1 to C6 form chain 1000, and all of the even checksums from C1 to C6 form a separate, mutually-exclusive chain 1002. Accordingly, this embodiment is described as a "tag chain" type of blockchain. In essence, one chain (or all the other chains) is "tagged out" while one chain is "tagged in" meaning it is active and therefore eligible to be connected to a new link in the chain, or otherwise receiving a new link in the chain. However, these chains are mutually-exclusive and thus only a single chain can be "tagged in" at any given point. These chains (and possibly including other chains as well, alternate between being active (i.e., receiving a new link) and inactive (waiting to receive a new link). In FIG. 10, checksum C7 represents the first link in (and the initiation of) new chain 1004.

In an embodiment herein, only a single chain is active at any given time.

Thus, the tag chain system contains at least a first chain and a second chain which are mutually-exclusive. In an embodiment herein, each chain is mutually-exclusive. However, in an embodiment herein the first chain and the second chain (and any other chains) are intertwined within the same blockchain system. In an embodiment herein, the checksums alternate between different chains, and one skilled in the art can understand that various patterns are possible, such as, but not exclusively, as defined herein. In such an embodiment, the chains may be mutually exclusive meaning that they do not contain any common links therebetween.

In an embodiment herein, the checksums are not linked into odd and even checksums, but could also be linked in a different pattern; or in a plurality of separate chains. In an embodiment herein, the chains are separated using sequence logic, for example, 1, 3, 5, 7, etc. which may be embedded within the checksum In an embodiment herein, the separation of the various links into different chains via a period of time, a number of checksums, a portion of a checksum, a modification to each checksum, a modulo method, a device or a plurality of devices, an address, an unique identifier, and a combination thereof; or a predetermined period of time, a predetermined number of checksums, a predefined portion of a checksum (or each checksum), a prefix modification to each checksum, a suffix modification to each checksum, a modulo method, a device or a plurality of devices, an address, an unique identifier, and a combination thereof.

For example, if the predetermined period of time is 1 hour, then every hour represents a separate link (e.g., C1 in FIG. 10) in a chain. Upon reaching the expiration of one hour, then the next link (e.g., C2 in FIG. 10) is initiated, and may be assigned to a different chain or the same chain, as desired. In another example, if the number of checksums (in each link) is 1000; or the predetermined number of checksums is 1000, then for every 1000 checksums, a different link is created. Typically there may be a pool of links or checksums which are arranged/assigned to chains in a first-in-first-out (FIFO) order. In yet another example, the selection of the chain for each link (or checksum) may use a modulo method (see https://en.wikipedia.org/wiki/Modulo_operation) to divide the link (or checksum) by a number and use the remainder to choose which chain to assign the link. In another example, a portion of the checksum, for example, 3 alphanumeric digits (a prefix, a suffix, or in the middle) are used to assign the checksum to the appropriate chain. In such an embodiment, for example, if a checksum is "12313393990A381F10" and the link is determined by a suffix, then the system will recognize the "F10" as a suffix and will assign this link to the "F10" chain. This is a common technique for "random"+round robin (chain) selection.

In an embodiment herein, a modification to each checksum is used, for example, 3 or more alphanumeric digits (a prefix, a suffix, or in the middle) are added to each link and are used to assign the link to the appropriate chain. In such an embodiment, for example, if a link (or a checksum) is "12313393990A381F10", then the system may add the alphanumeric digits "E35" to the beginning, middle or end of this link and then assign this link to the "E35" chain.

In an embodiment herein, the checksums, links and/or the chains may be divided up according to different devices, and/or by identifying different addresses; or IP addresses, machine addresses, email identifiers, account identifiers, etc. In an embodiment herein, each device is assumed to possess a different address.

In an embodiment herein, the first chain and the second chain are stored on the same server. Without intending to be limited by theory, it is believed that this may be desirable from a system architecture-point of view as it may make it easier to manage the tag chain system. In an embodiment herein, the first chain and the second chain are stored on different servers. Without intending to be limited by theory, it is believed that this may be desirable from a system architecture-point of view as it may make the tag chain system more secure.

In an embodiment herein, additional chains may be added when determined by an administrator, or when the tag chain system recognizes that the current time, energy requirements, etc. for generating the next link in the chain are too much; or greater than or equal to a predetermined value. Alternatively, the tag chain system may add one or more additional chains upon reaching a predetermined criteria, such as a predetermined number of links in the existing chain and/or most recent chain, a predetermined period of time, etc.

For example, the different links (and therefore the chains) may be separated by a specific period of time, or a group of checksums, a group of transactions, etc. In an embodiment herein, each link in the chain contains from about 1 transaction to about 1,000,000 transactions; or from about 1 to about 10,000 transactions; or from about 1 to about 1,000 transactions; or from about 2 transactions to about 10,000 transactions; or from about 100 transactions to about 1,000 transactions. In an embodiment herein, the link for each chain is defined by a time interval wherein all transactions and/or checksums that occur within the time interval either form a link (for the appropriate chain) and/or may be aggregated into a single link (for the appropriate chain). In an embodiment herein, the time interval is from about 1 millisecond to about 1 month; or from about 1 second to about 1 week; or from about 1 minute to about 1 day, as measured by the computer-implemented tag chain's system and/or server(s). Alternatively, the time interval could be measured by, for example, an internal computer clock, process, or that of an external server.

Without intending to be limited by theory, it is believed that the tag chain herein may provide significant advantages over a single integrated blockchain. For example, it is believed that as a blockchain becomes longer and longer, the checksum timing (e.g., the time it takes to generate a cryptographic hash) also increases in time, requires more energy, and/or requires more computing time. By employing the tag chain and therefore multiple actual chains within a single blockchain system, it is believed that the overall speed of the blockchain system may be accelerated, and/or may further possess additional benefits, such as lower energy consumption, lower computation time, etc. because, for example, the length of each of the individual chains grows more slowly.

In an embodiment herein, the different chains in a tag chain system are implemented in and/or stored on a common server or common servers. In an embodiment herein, each of the different chains in a tag chain system are implemented and/or stored on a different server or different servers. In an embodiment herein, each of the different chains in a tag chain system are implemented and/or stored on a plurality of servers.

Figure 11:
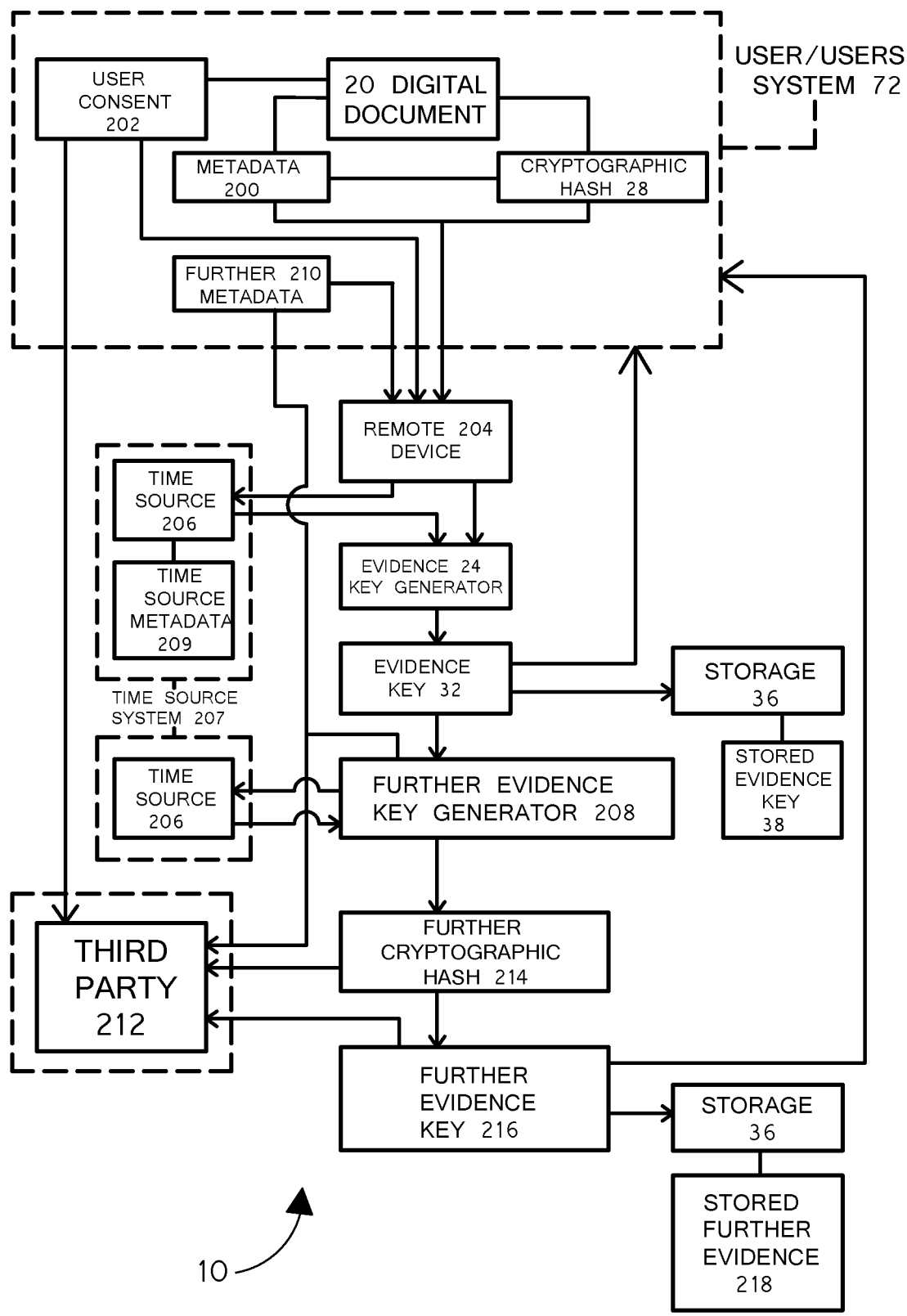
FIG. 11 shows a schematic flow diagram of an embodiment of the present invention.

FIG. 11 shows a schematic flow diagram of an embodiment of the method, 10, of the present invention, where a document, 20, herein a digital document, is located in a user's system, 72, and/or within control of a user, 72. The user's system, 72, obtains metadata, 200, of the digital document, 20. The user also provides user consent, 202, for various actions and processes, which typically includes permission and limitations to share information, data, etc. with and/or between other systems, such as the user's system, a remote device, a third party user, a third party user's system, etc. the user consent, 202, may be sent to the remote device, a third party user, a third party user's system, etc. as required.

In FIG. 11, the user typically provides the user consent while within the user's own system, 72. However, it is recognized that in an alternative embodiment, the user may provide user consent on a third party user's system, etc. The user's system, 72, generates a cryptographic hash, 28, from the digital document, 20, and optionally from the metadata, 200, or a portion thereof. The user's system, 72, sends the metadata, 200, the cryptographic hash, and optionally the user consent, 202, to a remote device, 204, typically over the internet and the remoted device, 204, receives the metadata, 200, the cryptographic hash, and optionally the user consent, 202.

As used in the figures, the lines between the invention features indicates that the features may be sent and/or received between the features.

The remote device, 204, requests a time stamp (see FIG. 1 at 26), from a time source, 206, and the time source, 206 sends the time stamp to the evidence key generator, 24. In the embodiment of FIG. 11, the time source, 206, is a separate time source system, 207, from the remote device, 204. The evidence key generator, 24, then generates an evidence key, 32, which is sent to storage, 36. The evidence key, 32, may also optionally be sent to and received by the user, 72, and/or the user's system, 72.

In FIG. 11 it can be seen that further metadata, 210, may be obtained from a source such as the user, the user's system, and a combination thereof. The further metadata, 210, may be sent to and received by the remote device, 204, a further evidence key generator, 208, a third party, 212, and a combination thereof. In an embodiment herein to further improve security, the further metadata, 210, is sent to and received by the third party, 212, but is not sent to the remote device, 204; or is only sent to the third party, 212.

In FIG. 11, the further evidence key generator, 208, generates a further cryptographic hash, 214, of the evidence key, 32, to form a further evidence key, 216. The further evidence key generator, 208, generates the further cryptographic hash from the evidence key. A further time stamp may be requested by, for example, the further evidence key generator, 208, from the same or a different time source, 206, as the time stamp, 26.

The time stamp may further contain time source metadata, 209, associated therewith, and/or incorporated therein.

The further evidence key generator, 208, generates a further cryptographic hash, 214, from the evidence key, and optionally the cryptographic hash, the metadata, the time stamp, the further time stamp, the further metadata, and a combination thereof. The further cryptographic hash then forms a further evidence key, 216, which is stored in storage, 36, to form a stored further evidence key, 218. The further evidence key, 216, may also optionally be sent to and received by the user, 72, and/or the user's system, 72.

Figure 12:
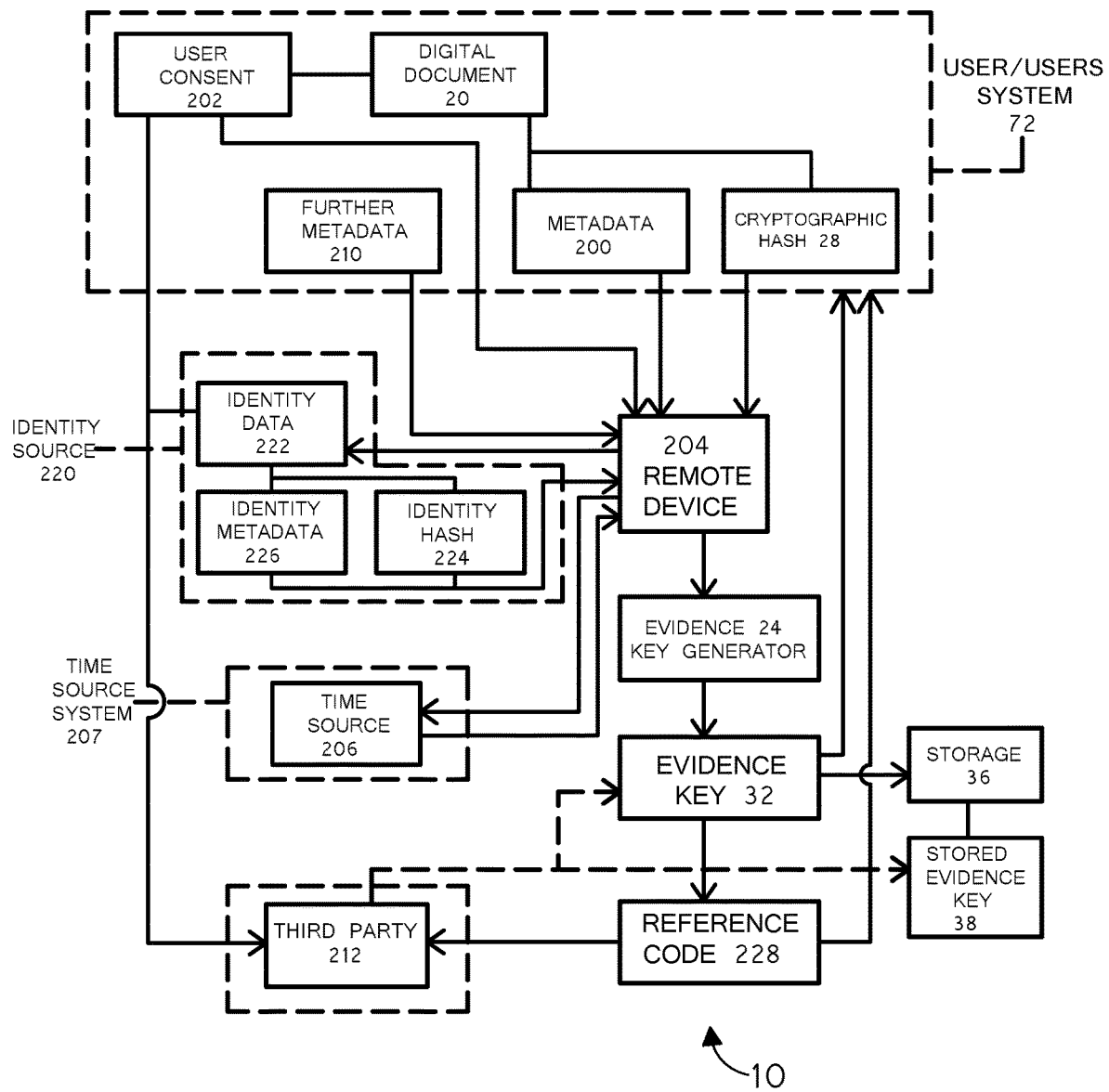
FIG. 12 shows a schematic flow diagram of an embodiment of the present invention for anonymously evidencing the existence of a digital document.

FIG. 12 shows a schematic flow diagram of an embodiment of the method, 10, of the present invention for anonymously evidencing the existence of a digital document, 20, which is useful while, for example, proving your age, vaccine status, etc. while also keeping your name and personal details private. A user obtains metadata, 200, and a cryptographic hash, 28, from a digital document, 20, such as a vaccine status certificate, in the user's control/within the user's system. The user also provides user consent, 202, relating to the digital document, relating to who may have access to the digital document, and under what conditions. The user may also provide further metadata, 210, about the digital document, and/or the conditions of use of the metadata, the cryptographic hash, the user consent, etc. In the embodiment of FIG. 12, these are all sent to the remote device, 204, which then sends a request to an identity source, 220, such as a government agency and/or a government website, for identity data, 222. To further protect the privacy of the user, the identity source, 220, generates a cryptographic hash of the identity data, 222, to form an identity hash, 224. The identity source, 220, then sends the identity hash, 224, to the remote device, 204. The identity source may optionally further provide identity metadata, 226, to the remote device, 204, with the identity metadata, 226, relating to, for example, the identity server identity, the identity data, the user, the identity hash, the cryptographic hashing algorithm and/or protocol used, etc.

In FIG. 12, the remote device, 204, also may simultaneously, requests a time stamp (see FIG. 1 at 26), from a time source, 206, and the time source, 206 sends the time stamp to the remote device, 204, although in some embodiments the time source, 206, may send the time stamp (see FIG. 1 at 26) directly to the evidence key generator, 24, if it is separate from the remote device, 204. The remote device, 204, the combines the identity hash, 224, the metadata, 200, and the cryptographic hash, 28, in the evidence key generator, 24, to provide an evidence key, 32. The remote device, 204, may further include additional features, such as, for example, the further metadata, 210, the time stamp (see FIG. 1 at 26), the identity metadata, 226, user consent, 202, etc. in the evidence key, 32, as desired. The user also provides user consent, 202, for various actions and processes, which typically includes permission and limitations to share information, data, etc. with and/or between other systems, such as the user's system, a remote device, a third party user, a third party user's system, etc. the user consent, 202, may be sent to the remote device, a third party user, a third party user's system, etc. as required.

The evidence key, 32, is typically then stored by sending it to storage, 36, to form a stored evidence key, 38.

The evidence key may also optionally be sent to, for example, the user/user's system, 72, a third party, 212, etc. according to the instructions/permissions for this typically found in the user consent, 202. The evidence key, 32, will also be used to generate a reference code, 228, which then may be sent to, for example, the user/user's system, 72, a third party, 212, etc. according to the instructions/permissions for this typically found in the user consent, 202.

The third party, 212, or the user, 72, possessing the reference code, 228, is then allowed access to the evidence key, 32, and/or the stored evidence key, 38. For example, if the reference code is a QR code, the digital document is a vaccination record, the user consent allows the category of "restaurants" to access the evidence key, and a certain restaurant requires proof of vaccination status in order to enter, then the user may show the QR code to the restaurant upon entering. The restaurant may scan the QR code, and be directed to a government or health provider website/database which shows the user's photo and a vaccination status confirmation or denial. The restaurant may then be assured that the user is vaccinated. There is no need for the user to disclose other private information such as address, name, birth date, other health information, etc.

In another example similar to the above, except that the digital document is a driver's license or a passport, the user consent allows the category of "bars" to access the evidence key, and bars are required to check for proof of age upon entering. The user may present the QR code to the bar upon entry and the bar may then scan the QR code and be directed to a government or other official website which confirms or denies that the user is of legal age to enter the bar. This, the bar may be assured that the user is of age, and the user is not required to show or disclose to the bar any additional information typically present on, for example, a driver's license, such as name, address, blood type, etc.

It is recognized that the storage, 36, may be, for example, a private storage by, for example, a trusted organization, a private storage, a governmental/official storage, and a combination thereof. Without intending to be limited by theory, it is believed that such an arrangement may be useful for balancing the user's privacy concerns with that of the government, society, etc.

Figure 13:
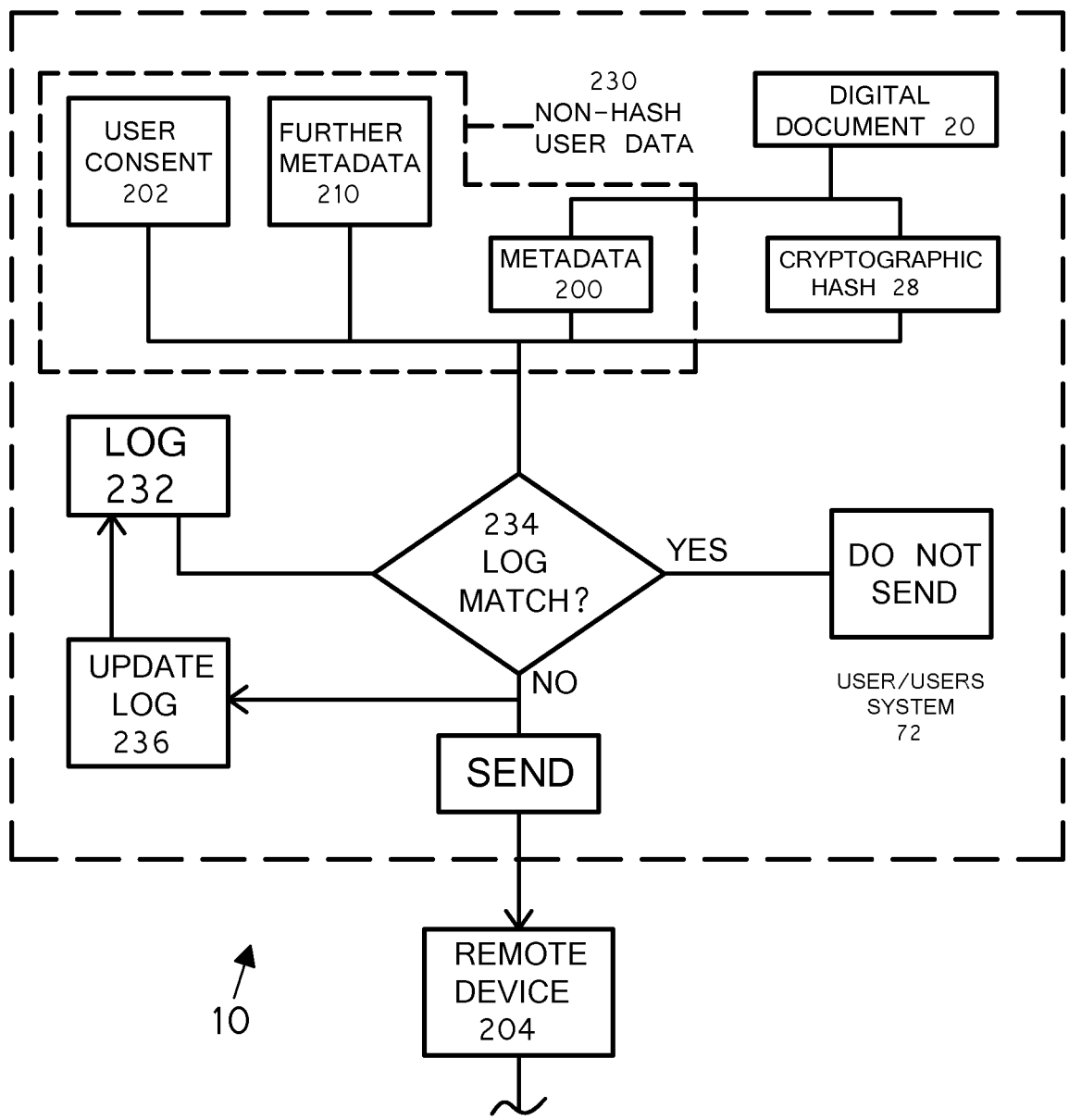
FIG. 13 shows a schematic flow diagram of an embodiment of the present invention for evidencing the existence of a digital document.

FIG. 13 shows a schematic flow diagram of an embodiment of the method, 10, of the present invention for evidencing the existence of a digital document, 20. The digital document, 20, cryptographic hash, 28, and other non-hash user data, 230, are provided/generated as described herein for a user/user's system. The non-hash user data herein includes, for example, metadata, 200, further metadata, 201, user consent, 202, and a combination thereof.

A log, 230, contains a record of previous cryptographic hashes generated by the user/user's system. The log organized is not important and may be in any manner, such as according to the cryptographic hash, according to the user's system's time clock, etc. as long as the cryptographic hash is searchable. In step 234, the user's system receives the cryptographic hash, 28, and queries the log, 232, to see if the same cryptographic hash, 28, already exists in the log, 232. If the same cryptographic hash, 28, does not already exist in the log, 232, then the cryptographic hash (and other information) is sent to the remote device, 204, third party user, etc. as per the invention herein, whereas if the cryptographic hash, 28, already exists in the log, 232, then the cryptographic hash and non-hash user data, 230, is not sent to the remote device, 204, third party user, etc. It is recognized that within a system as described herein, the database may potentially acquire millions, if not billions of evidence keys. Furthermore, it is recognized that the same digital document may have a cryptographic has generated for it multiple times. However, while the user may wish to have a complete records of their digital documents, it is not efficient for the same cryptographic hash to be sent to the remote device multiple times by the same user. Accordingly, this embodiment seeks to reduce unneeded, duplicative cryptographic hashes from being sent to the remote device, thereby reducing the generation of unneeded evidence keys.

In another embodiment herein, step 234 checks the cryptographic hash, 28, as well as non-hash user data, 230, to see whether it matches the data in the log, 232. If step 234 detects an exact match of the cryptographic hash, 28, and the non-hash user data, 230, then the user's system, 72, does not send the cryptographic hash and non-hash user data, 230, to the remote device, 204, third party user, etc. However, if the user's system, 72, does not detect an exact match of the cryptographic hash, 28, and the non-hash user data, 230, then the user's system, 72, sends the cryptographic hash and non-hash user data, 230, to the remote device, 204, third party user, etc. It is recognized that the benefit of this embodiment is that it allows the user to update, for example, the user consent and sent to the remote device to be updated in the system.

In FIG. 13, if the cryptographic hash and the non-hash user data is sent to the remote device, 204, then at step 236, the user's system, 72, typically also updates the log, 232, to include the cryptographic hash, 28 and/or the non-hash user data, 230. This step helps to keep the log, 232, updated and current.

Figure 14:
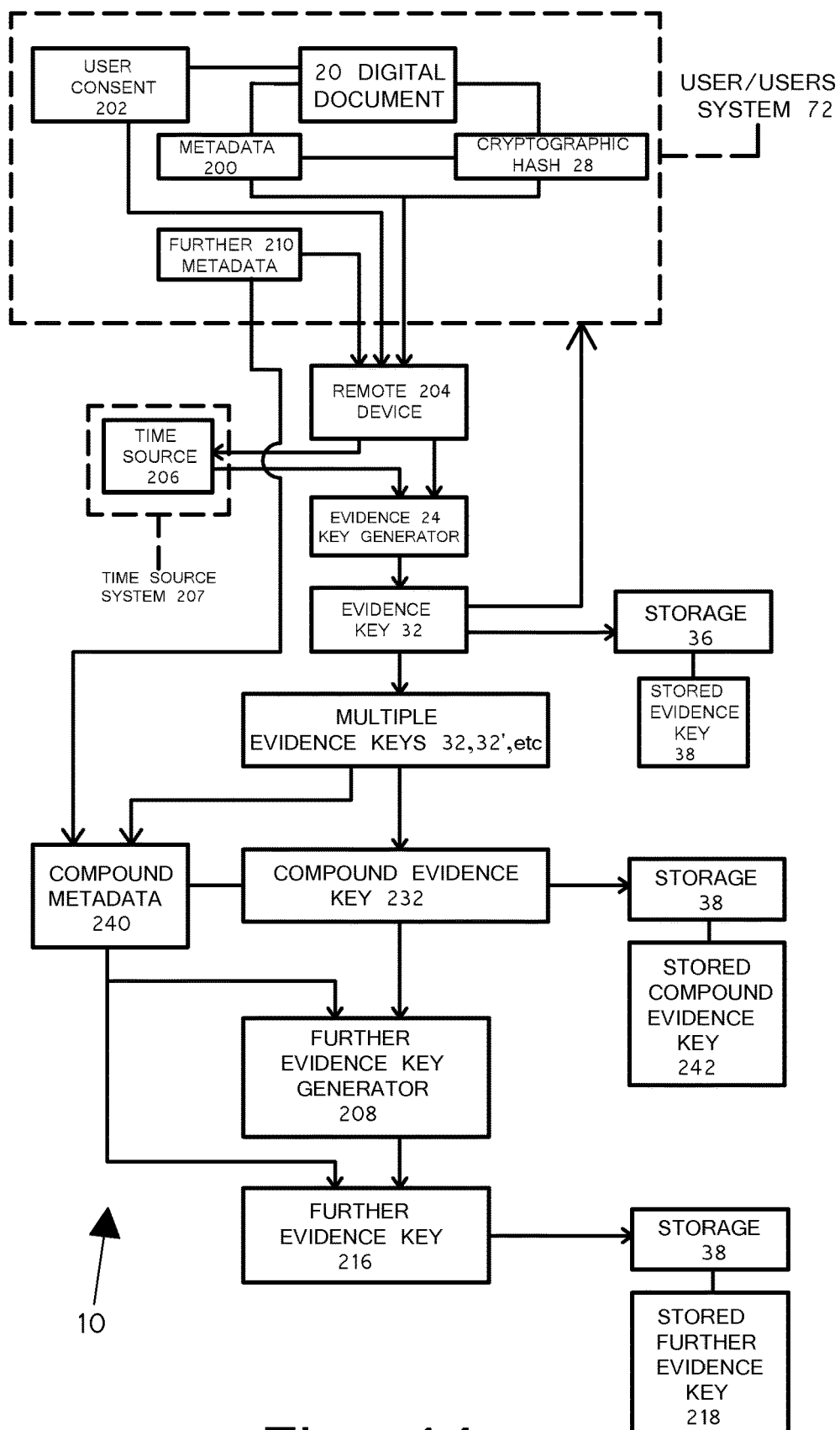
FIG. 14 shows a schematic flow diagram of an embodiment of the present invention.

FIG. 14 shows a schematic flow diagram of an embodiment of the method, 10, of the present invention for evidencing the existence of a digital document, 20, where the user/user's system, 72, obtains the metadata, 200, cryptographic hash, 28, further metadata, 210, and user consent, 202, as described herein and sends it to the remote device, 204, which receives it. The remote device, 204, and requests a time stamp (see FIG. 1 at 26) from the time source, 206, which sends the time stamp (see FIG. 1 at 26) to the remote device, 204, which in FIG. 14 is the evidence key generator, 24. The evidence key generator, 24, generates an evidence key, 32, and sends the evidence key to the user/user's system, 72, and to the storage, 36, so that it forms a stored evidence key, 38, as usual.

In FIG. 14, the remote device collects a plurality of evidence keys, 32, 32', etc. and combines them to form a compound evidence key, 238. The compound evidence key may or may not be subject to a cryptographic hash step, as desired. The compound evidence key may further be associated with compound metadata, 240, which may include, for example, how the multiple evidence keys are combined to form the compound evidence key, and/or the interrelationship between the evidence keys, 32, 32', etc., the metadata, 200, the further metadata, 210, the user consent, 202, and combinations thereof. The compound evidence key, 232, is stored in storage, 36, to provide a stored compound evidence key, 242.

The compound evidence key, 232, and optionally the compound metadata, 240, the user consent, 202, the further metadata, 210, etc. is then provided to the further evidence key generator, 208, which generates a further evidence key, 216. The further evidence key, 216, is stored in storage, 36, to provide a stored further evidence key, 218.

Figure 15:
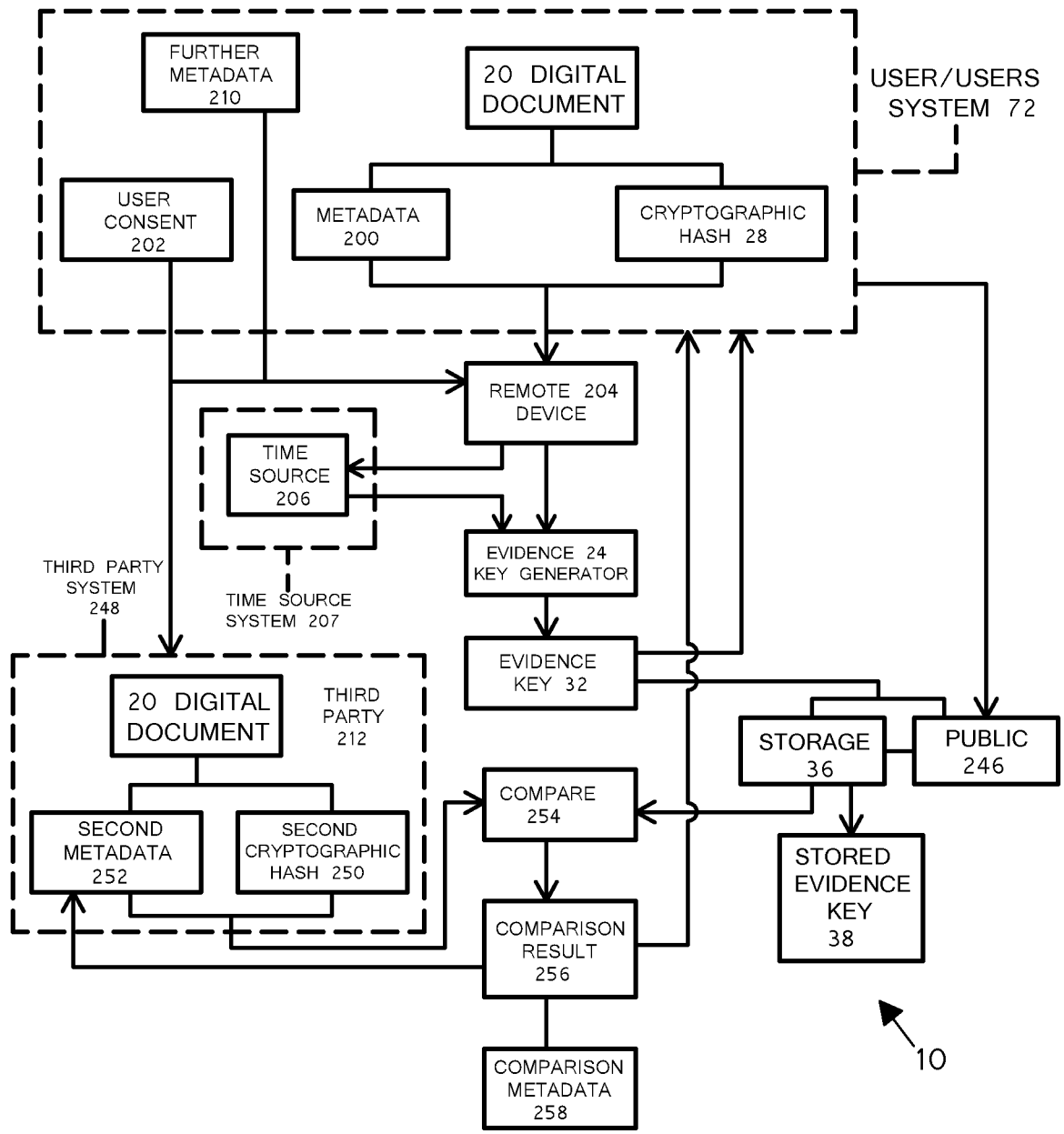
FIG. 15 shows a schematic flow diagram of an embodiment of the present invention for verifying the integrity of a digital document.

FIG. 15 shows a shows a schematic flow diagram of an embodiment of the method, 10, of the present invention for verifying the integrity of a digital document, 20 where the user/user's system, 72, obtains the metadata, 200, cryptographic hash, 28, further metadata, 210, and user consent, 202, as described herein and sends it to the remote device, 204, which receives it. The remote device, 204, and requests a time stamp (see FIG. 1 at 26) from the time source, 206, which sends the time stamp (see FIG. 1 at 26) to the remote device, 204, which in FIG. 15 is the evidence key generator, 24. The evidence key generator, 24, generates an evidence key, 32, and sends the evidence key to the user/user's system, 72, and to the storage, 36, so that it forms a stored evidence key, 38, as usual.

A third party, 212, may use their third party system, 248, to obtain a second cryptographic hash, 250 (using the same cryptographic hashing algorithm as used to create the cryptographic hash, 28), and optional second metadata, 252. In step 254, the third party, 212, the user, 72, the remote device, 204, etc. may then compare the cryptographic hash, 28 in the evidence key, 24, and the second cryptographic hash, 250, to generate a comparison result, 256. Alternatively, in step 254, the third party, 212, the user, 72, the remote device, 204, etc. may then compare the entire evidence key, 72, with the second metadata, 252, and the second cryptographic hash, 250 to generate the comparison result, The comparison result may, for example, be very simple, with merely a verification confirmation sent to the third party, 212, may be very detailed, indicating every single difference between the second metadata, 252, and the second cryptographic hash, 250 and the stored evidence key, 38, or may be somewhere in-between. The comparison result may also be sent to the user/user's system, 72. The comparison result, 256, may further contain comparison metadata, 258, which is metadata related to the comparison of the cryptographic hash, the evidence key, the metadata, the further metadata, the user consent, the second metadata, the second cryptographic hash, etc.

The user/use's system, 72, and/or the remote device, 204, may make the evidence key, 32, public, 246, by, for example. posting it on a public website, etc.

During the method of FIG. 15, the digital document remains within the user's system, the third party's system, or both. However, the digital document is not sent or otherwise provided to the remote device. As noted herein, such a method is believed to engender trust by, for example, a third party intending to install the user's software package on the third party's system. By using such a method, if the third party receives a positive comparison result, then the third party is assured that the software package has not been tampered with between the time that the user generated the (first) cryptographic hash and when they generated the second cryptographic hash. Alternatively, if the software package has been tampered with, then the cryptographic hash and the second cryptographic hash would not match, and this would be highlighted in the comparison result. The third party user would then be wise to seek additional information and/or to not install the software package on the third party system. If the comparison result is also sent to the user, then the user may also be able to investigate how and/or when the software package was altered.

In an embodiment herein, the aggregation storage server creates a duplicate database of the evidence key and any additional associated data.

In yet another embodiment, the evidence key may also contain a time-dependent key, which is independent from the content or any properties of the digital document generated by the system.

In an embodiment herein, the cryptographic hash is a quantum hash intended to be calculated by a quantum computer.

In an embodiment herein, the cryptographic hash is a neural hash which uses a convolutional neural network to compute the hash and is therefore insensitive to small changes in the digital document; or an image.

In an embodiment herein, a sending step and/or a receiving steps; or a plurality of the sending steps and/or a plurality of the receiving steps, are achieved using a form of public key/private key encryption (e.g., asymmetric cryptography, asymmetric encryption, etc.), such as, for example, SSL/TLS protocol, etc. Such keys may be created using, for example, RSA, DSA, and/or ECC algorithms.

In an embodiment herein, the user's computer; or the user's server; or the user's web browser creates the cryptographic hash of, for example, the digital document. The user's computer; or the user's server; or the user's web browser may also send the cryptographic hash to a remote device; or an evidence key generator; or a storage device. In an embodiment herein, the user's computer; or the user's server; or the user's web browser collects metadata from the digital document and/or the user and sends the metadata to a remote device; or an evidence key generator; or a storage device. In an embodiment herein, the user's computer; or the user's server; or the user's web browser collects further metadata from the digital document and/or the user and sends the further metadata to a remote device; or an evidence key generator; or a storage device.

In an embodiment of the method herein the user employs a web browser to access a website, the user selects a digital document with the web browser, and the web browser accesses an algorithm from the website to generate a cryptographic hash of the digital document. In an embodiment of the method herein the user employs a web browser to access a website, the user selects a digital document with a user interface such as, for example, a mouse pointer; or the user drags and drops the image of the digital document on to a graphical user interface of the web browser, and the web browser accesses an algorithm from the website to generate a cryptographic hash of the digital document.

In an embodiment herein, the user's computer; or the user's server; or the user's web browser is behind a firewall; or behind the user's firewall.

In an embodiment herein the method and/or the system employs two-factor identification, three-factor identification, and/or multiple-factor identification in one or more steps so as to enhance the security of the method and/or the system.

In an embodiment herein the cryptographic hash is obtained from the digital document and the metadata. In such a system the metadata, as encompassed by the cryptographic hash, is sent form the user's system to the remote device. It is believed that such a feature further enhances security of the system.

In an embodiment herein, the digital document may include information selected from the group consisting of, for example, biometric information, financial information, health information, historical information, identity information, legal information, ownership information, personal information, relationship information, and a combination thereof. Biometric information may include, for example, facial recognition information, anatomical information, gait analysis information, eye information, fingerprint information, odor information, genetic information, hand geometry information, blood vessel/vein information, typing rhythm information, signature information, voice information, behaviometric information, etc. corporate information may include, for example, information about a company such as its founding date, dissolution date, incorporation status, legal status, shareholders, allocated shares, assets, debts, meeting minutes, etc. Financial information may include, for example, bank information, brokerage information, loan information, portfolio information, etc. Health information may include, for example, health/disease history, blood type, major histocompatibility complex information, hospital records, vaccination information, etc. Historical information may include, for example, lineage information, correlation with historical events and individuals, ancestral information, descendant information, etc. Identity information may include, for example, government and other identity documents, such as drivers' licenses information, passport information, etc. Legal information may include, for example, contract information, estate information, will information, ownership information, chain of title information, transaction information, etc. Personal information may include, for example, relationship information, address information, marital information, dependent information, tax information, password information, etc.

In an embodiment of the method herein the metadata, the cryptographic hash, time stamp, further cryptographic hash, further metadata, evidence key, further evidence key, reference code, etc. other than the digital document itself, may be sent and/or received over the internet, an intranet, and a combination thereof.

In an embodiment herein the digital document is never sent to the remote device, and always remains within the user's control and/or the user's system.

In an embodiment herein, the cryptographic hash is a distributable, interoperative cryptographic hash.

An embodiment of the present invention specifically relates to one or more systems for implementing the methods described herein.

It is understood by those skilled in the art that, for example, the number of time stamps, cryptographic hashes, cryptographic hash functions, evidence key generators, associated data, storage, receiving servers, storage servers, aggregation storage servers, etc., are not limited by the description herein. It is understood that the actual number can be adjusted based on the actual implementation of the invention. Moreover, additional algorithms could be implemented at different levels of the system to improve the reliability and integrity of the system. In an embodiment, when a duplicate evidence key is detected in any of the databases, a warning notice will be provided to the system administrator and the earliest creator of such an evidence key.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. As a result, such features are inherently rooted in computer technology and solve problems which are inherently related to computer technology. For example, embodiments of the present invention may generate cryptographic hashes (such as the cryptographic hash 28 and the cryptographic hash 28') on amounts of data and within amounts of time that would be impossible or infeasible to perform manually. For example, embodiments of the present invention may generate a cryptographic hash on a megabyte of data in less than one second, which would be impossible for a human to perform manually. As another example, embodiments of the present invention may deliver data (e.g., via delivery 40 or delivery 40') over the Internet and/or other electronic communications network, which inherently requires the use of telecommunications equipment and which cannot be performed manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store)

programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Non-limiting embodiments of the present invention include:

1. A computer-implemented method for evidencing the existence of a digital document comprising the steps of:
   A. obtaining a time stamp of the digital document;
   B. obtaining a plurality of cryptographic hashes of the digital document;
   C. generating an evidence key based on the time stamp and the plurality of cryptographic hashes; and
   D. storing the evidence key to provide a stored evidence key.
2. The method according to embodiment 1, further comprising the step of:
   E. retrieving the evidence key to provide a retrieved evidence key.
3. The method according to embodiment 2, further comprising the step of:
   F. comparing the stored evidence key to the retrieved evidence key.
4. The method according to embodiment 2, wherein the retrieval of the evidence key is enabled by providing an identifier; or wherein the identifier is selected from the group consisting of a cryptographic hash, additional associated data, and a combination thereof.
5. The method according to any one of embodiments 1-4, wherein the time stamp is a plurality of time stamps.
6. The method according to any one of embodiments 1-5, wherein the plurality of cryptographic hashes is from about 2 to about 100 cryptographic hashes; or from about 2 to about 25 cryptographic hashes; or from about 3 to about 10 cryptographic hashes; or from about 4 to about 8 cryptographic hashes.
7. The method according to any one of embodiments 1-6, wherein each of the plurality of cryptographic hashes is generated by a different cryptographic hash function.
8. The method according to any one of embodiments 1-7, wherein at least one of the cryptographic hashes is generated by an unkeyed cryptographic hash function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, RadioGatnn, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof, or an unkeyed cryptographic hash function selected from the group consisting of SHA-1, SHA-224, SHA-256, SHA-384, SHA-512, SHA-3, and a combination thereof, or an unkeyed cryptographic hash function selected from the group consisting of SHA2-256, SHA2-512, SHA3-256, SHA-3, and a combination thereof.
9. The method according to any one of embodiments 1-8, wherein the time stamp comprises a plurality of time stamps; or from about 2 to about 10 time stamps; or from about 2 to about 8 times tamps; or from about 3 to about 6 time stamps.
10. The method according to any one of embodiments 1-9, wherein the storing of the evidence key occurs on a storage media selected from the group consisting of a server, a storage drive, paper, a CD-ROM, a DVD, a single-use storage media, and a combination thereof; or a server, a storage drive, a CD-ROM, a DVD, a single-use storage media, and a combination thereof; or a server, a storage drive, a CD-ROM, a DVD, and a combination thereof, or a disk drive, a flash memory, a magnetic tape, and a combination thereof, or a hard disk, a floppy disk, a magneto-optical disk, a flash memory, a magnetic tape, and a combination thereof, or a hard disk, a flash memory, and a combination thereof.
11. A computer-implemented method for evidencing the existence of a digital document comprising the steps of:
    A. obtaining a plurality of time stamps of the digital document;
    B. obtaining a cryptographic hash of the digital document;
    C. generating an evidence key based on the plurality of time stamps and the cryptographic hash; and
    D. storing the evidence key to provide a stored evidence key.
12. The method according to embodiment 11, further comprising the step of:
    E. retrieving the evidence key to provide a retrieved evidence key.
13. The method according to embodiment 12, further comprising the step of:
    F. comparing the stored evidence key to the retrieved evidence key.
14. The method according to embodiment 12, wherein the retrieval of the evidence key is enabled by providing an identifier; or wherein the identifier is selected from the group consisting of a cryptographic hash, additional associated data, and a combination thereof.
15. The method according to any one of embodiments 11-14, wherein the plurality of time stamps is from about 2 to about 10 time stamps; or from about 2 to about 8 times tamps; or from about 3 to about 6 time stamps.
16. The method according to any one of embodiments 11-15, wherein each of the plurality of time stamps is generated by a different time source selected from the group consisting of a time server, an independent clock, and a combination thereof, or a time server, an independent clock, and a combination thereof, or a Global Positioning System (GPS) clock.
17. The method according to any one of embodiments 11-16, wherein the cryptographic hash is a plurality of cryptographic hashes; or wherein the cryptographic hash is from about 2 to about 100 cryptographic hashes; or from about 2 to about 25 cryptographic hashes; or from about 3 to about 10 cryptographic hashes; or from about 4 to about 8 cryptographic hashes.
18. The method according to embodiment 17, wherein each of the plurality of cryptographic hashes is generated by a different cryptographic hash function.
19. The method according to any one of embodiments 11-18, wherein the cryptographic hash is generated by an unkeyed cryptographic hash function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, RadioGatnn, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof, or an unkeyed cryptographic hash function selected from the group consisting of SHA-1, SHA-224, SHA-256, SHA-384, SHA-512, SHA-3, and a combination thereof, or an unkeyed cryptographic hash function selected from the group consisting of SHA2-256, SHA2-512, SHA3-256, SHA-3, and a combination thereof.

20. The method according to any one of embodiments 11-19, wherein the storing of the evidence key occurs on a storage media selected from the group consisting of a server, a storage drive, paper, a CD-ROM, a DVD, a single-use storage media, and a combination thereof; or a server, a storage drive, a CD-ROM, a DVD, a single-use storage media, and a combination thereof; or a server, a storage drive, a CD-ROM, a DVD, and a combination thereof, or a disk drive, a flash memory, a magnetic tape, and a combination thereof, or a hard disk, a floppy disk, a magneto-optical disk, a flash memory, a magnetic tape, and a combination thereof, or a hard disk, a flash memory, and a combination thereof.

21. A computer-implemented method for evidencing the existence of a digital document comprising the steps of:
    A. obtaining a time stamp of the digital document;
    B. obtaining a cryptographic hash of the digital document;
    C. generating an evidence key based on the time stamp and the cryptographic hash; and
    D. storing the evidence key to provide a stored evidence key, wherein the storing of the evidence key is stored on a plurality of storage media.

22. The method according to embodiment 21, further comprising the step of:
    E. retrieving the evidence key to provide a retrieved evidence key.

23. The method according to embodiment 22, further comprising the step of:
    F. comparing the stored evidence key to the retrieved evidence key.

24. The method according to embodiment 22, wherein the retrieval of the evidence key is enabled by providing an identifier; or wherein the identifier is selected from the group consisting of a cryptographic hash, additional associated data, and a combination thereof.

25. The method according to any one of embodiments 21-24, wherein the each of the plurality of storage media is selected from the group consisting of a server, a storage drive, paper, a CD-ROM, a DVD, a single-use storage media, and a combination thereof, or a server, a storage drive, a CD-ROM, a DVD, a single-use storage media, and a combination thereof; or a server, a storage drive, a CD-ROM, a DVD, and a combination thereof, or a disk drive, a flash memory, a magnetic tape, and a combination thereof, or a hard disk, a floppy disk, a magneto-optical disk, a flash memory, a magnetic tape, and a combination thereof, or a hard disk, a flash memory, and a combination thereof.

26. The method according to any one of embodiments 21-25 wherein the plurality of storage media are located in a plurality of physical locations; or a plurality of different physical locations; or from about 2 to about 20 different physical locations; or from about 2 to about 15 different physical locations; or from about 3 to about 10 different physical locations.

27. The method according to any one of embodiments 21-26, wherein the time stamp comprises a plurality of time stamps; or from about 2 to about 10 time stamps; or from about 2 to about 8 times tamps; or from about 3 to about 6 time stamps.

28. The method according to any one of embodiments 21-27, wherein the wherein the cryptographic hash is a plurality of cryptographic hashes; or wherein the cryptographic hash is from about 2 to about 100 cryptographic hashes; or from about 2 to about 25 cryptographic hashes; or from about 3 to about 10 cryptographic hashes; or from about 4 to about 8 cryptographic hashes.

29. The method according to any one of embodiments 21-28, wherein the cryptographic hashes are generated by an unkeyed cryptographic hash function; or an unkeyed cryptographic hash function selected from the group consisting of BLAKE-256, BLAKE-512, BLAKE2b, BLAKE2s, ECOH, GOST, Grøstl, HAS-160, HAVAL, JH, MD2, MD4, MD5, MD6, RadioGatnn, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, Whirlpool, and a combination thereof, or an unkeyed cryptographic hash function selected from the group consisting of SHA-1, SHA-224, SHA-256, SHA-384, SHA-512, SHA-3, and a combination thereof, or an unkeyed cryptographic hash function selected from the group consisting of SHA2-256, SHA2-512, SHA3-256, SHA-3, and a combination thereof.

30. A computer-implemented method for evidencing the existence of a plurality of digital documents containing the steps of:
    A. receiving a plurality of cryptographic hashes during a first time period;
    B. generating a current checksum based on the plurality of cryptographic hashes received during the first time period;
    C. storing the current checksum in a storage media;
    D. receiving a plurality of cryptographic hashes during a second time period;
    E. generating a next checksum based on the plurality of cryptographic hashes received during the second time period;
    F. storing the next checksum in the storage media; and
    G. replacing the checksum in the storage media with the next checksum.

31. The method according to embodiment 30, further containing the steps of repeating steps D to G.

32. A computer-implemented method for evidencing the existence of a plurality of digital document containing the steps of:
    A. receiving a plurality of evidence keys during a first time period;
    B. generating a current checksum based on the plurality of evidence keys received during the first time period;
    C. storing the current checksum in a storage media;
    D. receiving a plurality of evidence keys during a second time period;
    E. generating a next checksum based on the plurality of evidence keys received during the second time period;

F. storing the next checksum in the storage media; and
G. replacing the checksum in the storage media with the next checksum.
33. The method according to embodiment 32, further containing the steps of repeating steps D to G.
34. A computer-implemented method for evidencing the existence of a plurality of digital documents containing the steps of:
A. receiving a plurality of cryptographic hashes during a first time period;
B. generating a current checksum based on the plurality of cryptographic hashes received during the first time period;
C. storing the current checksum in a storage media;
D. receiving a plurality of cryptographic hashes during a second time period;
E. generating a current checksum based on the plurality of cryptographic hashes received during the second time period;
F. storing the current checksum in the storage media;
G. receiving a plurality of cryptographic hashes during a next time period;
H. generating a next checksum based on the plurality of cryptographic hashes received during the next time period and the current checksum from step B;
I. storing the next checksum in a storage media;
J. replacing the current checksum stored in step C with the next checksum stored in step I;
K. receiving a plurality of cryptographic hashes during a next time period;
L. generating a next checksum based on the plurality of cryptographic hashes received during the next time period and the current checksum from step E;
M. storing the next checksum in a storage media; and
N. replacing the current checksum stored in step F with the next checksum stored in step M.
35. The method according to embodiment 34, further containing the steps of repeating steps G to N.
36. A computer system for evidencing the existence of a digital document, the system comprising the method according to any one of the preceding embodiments.
37. A computer-implemented tag chain system having:
A. a first chain; and
B. a second chain, wherein the first chain and the second chain are mutually-exclusive.
38. The tag chain system according to Embodiment 37, wherein the first chain and the second chain are stored on the same server.
39. The tag chain system according to Embodiment 38, wherein the first chain and the second chain are stored on different servers.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:
1. A computer-implemented method for evidencing the existence of a digital document comprising the steps of:
A. obtaining metadata of a digital document in a user's system;
B. obtaining a cryptographic hash of the digital document via the user's system;
C. sending the metadata and the cryptographic hash from the user's system to a remote device; or sending the metadata and the cryptographic hash to the remote device over the internet;
D. receiving the metadata and the cryptographic hash at the remote device;
E. requesting a time stamp from a time source;
F. receiving the time stamp at the remote device from the time source, wherein the remote device does not comprise the time source, and wherein the time stamp is based upon the time that the remote device receives the metadata and the cryptographic hash;
E. combining the metadata, the cryptographic hash, and the time stamp in an evidence key generator to generate an evidence key;
F. storing the evidence key to provide a stored evidence key;
G. generating a further cryptographic hash of the evidence key in a further evidence key generator to form a further evidence key; and
H. storing the further evidence key to form a stored further evidence key,
wherein during the method the digital document remains within the user's system.
2. The method according to claim 1, further comprising the step of:
obtaining further metadata from a source selected from the group consisting of the user, the user's system, and a combination thereof.
3. The method according to claim 2, wherein the further cryptographic hash is generated in the further evidence key generator from the evidence key and the further metadata.
4. The method according to claim 2, further comprising the step of:
combining the further cryptographic hash and the further metadata in the further evidence key generator to form the further evidence key.
5. The method according to claim 2, further comprising the step of:
providing the further metadata to a third party; or providing the further metadata to the third party wherein the further metadata is not provided to the remote device.
6. The method according to claim 5, further comprising the step of:
obtaining the user's consent to send the further metadata to a third party, wherein the obtaining of the user's consent occurs prior to the sending of the further metadata to the third party.
7. The method according to claim 1, wherein in step C the user's system only sends the metadata and the cryptographic hash to the remote device.
8. The method according to claim 1, further comprising the step of:
sending the further cryptographic hash to a third party.
9. The method according to claim 8, further comprising the step of:
obtaining the user's consent to send the further cryptographic hash to a third party,
wherein the obtaining of the user's consent occurs prior to the sending of the further cryptographic hash to the third party.

10. The method according to claim 1, wherein the cryptographic hash is obtained from the digital document and the metadata.

11. A computer-implemented method for anonymously evidencing the existence of a digital document comprising the steps of:
  A. obtaining metadata of a digital document in a user's system;
  B. obtaining a cryptographic hash of the digital document;
  C. sending the metadata and the cryptographic hash to a remote device;
  D. receiving the metadata and the cryptographic hash at the remote device,
  E. requesting the user's identity data from an identity source;
  F. obtaining a cryptographic hash of the user's identity data to form an identity hash;
  G. receiving the identity hash at the remote device;
  H. combining the metadata, the cryptographic hash, and the identity hash at the remote device in an evidence key generator to generate an evidence key;
  I. storing the evidence key to provide a stored evidence key;
  J. generating a reference code for the stored evidence key; or wherein the reference code is a QR code, and
  K. sending the reference code to the user,
  wherein the digital document never leaves the user's system, wherein the identity data never leaves the identity source, and wherein the reference code allows a third party to access the evidence key; or allows a third part limited access to the evidence key.

12. The method according to claim 11, further comprising the steps of:
  requesting a time stamp by the remote device from a time source;
  receiving the time stamp at the remote device from the time source, and wherein
  the remote device does not comprise the time source.

13. The method according to claim 11, wherein the digital document comprises information selected from the group consisting of biometric information, corporate information, financial information, health information, historical information, identity information, legal information, personal information, and a combination thereof.

14. A computer-implemented method for evidencing the existence of a digital document comprising the steps of:
  A. obtaining metadata of a digital document on a user's system;
  B. obtaining a cryptographic hash of the digital document;
  C. sending the metadata and the cryptographic hash from the user's system to a remote device; or sending the metadata and the cryptographic hash to the remote device over the internet;
  D. receiving the metadata and the cryptographic hash at the remote device;
  E. requesting a time stamp from a time source;
  F receiving the time stamp at the remote device from the time source, wherein the remote device does not comprise the time source, and wherein the time stamp is based upon the time that the remote device receives the metadata and the cryptographic hash;
  G. combining the metadata, the cryptographic hash, and the time stamp at the remote device in an evidence key generator to generate an evidence key;
  H. combining a plurality of evidence keys to form a compound evidence key;
  I. storing the compound evidence key to provide a stored compound evidence key;
  J. generating a further cryptographic hash of the compound evidence key to form a further evidence key; and
  K. storing the further evidence key to form a stored further evidence key.

15. The method according to claim 14, wherein the plurality of evidence keys comprises between 2 and 1000 evidence keys.

16. The method according to claim 14, further comprising the step of storing compound metadata with the plurality of evidence keys to form the compound evidence key.

17. The method according to claim 16, wherein a predetermined period of time determines which evidence keys in the plurality of evidence keys are combined into the compound evidence key.

18. A method for verifying the data integrity of a digital document comprising the steps of:
  A. storing a digital document on a user's system;
  B. obtaining metadata of the digital document;
  C. obtaining a cryptographic hash of the digital document;
  D. sending the metadata and the cryptographic hash to a remote device;
  E. receiving the metadata and the cryptographic hash at the remote device;
  F. requesting a time stamp from a time source;
  G. receiving the time stamp at the remote device from the time source, wherein the remote device does not comprise the time source;
  H. combining the metadata, the cryptographic hash, and the time stamp at the remote device in an evidence key generator to generate an evidence key;
  I. storing the evidence key to provide a stored evidence key;
  J. obtaining a second cryptographic hash of the digital document by a third party user;
  K. comparing the second cryptographic hash with the cryptographic hash in the stored evidence key to generate a comparison result; and
  L. notifying the third party user of the comparison result,
  wherein during the method the digital document remains within the user's system, the third party user's system, or both.

19. The method for verifying the data integrity of a digital document according to claim 18, wherein the third party user is different from the user.

20. The method for verifying the data integrity of a digital document according to claim 18, further comprising the steps of:
  the third party user obtaining second metadata from the digital document;
  comparing the second metadata with the metadata to generate the comparison result.

21. The method for verifying the data integrity of a digital document according to claim 18, further comprising the steps of:
  making the evidence key; or the cryptographic hash, publicly-available.

* * * * *